(12) United States Patent
Kennedy et al.

(10) Patent No.: US 10,618,999 B2
(45) Date of Patent: Apr. 14, 2020

(54) POLYISOBUTYLENE-BASED POLY(URETHANE-UREA)S

(71) Applicants: Joseph Kennedy, Akron, OH (US);
Kalman Toth, Cuyahoga Falls, OH (US); Nihan Nugay, Istanbul (TR)

(72) Inventors: Joseph Kennedy, Akron, OH (US);
Kalman Toth, Cuyahoga Falls, OH (US); Nihan Nugay, Istanbul (TR)

(73) Assignee: THE UNIVERSITY OF AKRON, Akron, OH (US)

(*) Notice: Subject to any disclaimer, the term of this patent is extended or adjusted under 35 U.S.C. 154(b) by 7 days.

(21) Appl. No.: 16/072,612

(22) PCT Filed: Jan. 24, 2017

(86) PCT No.: PCT/US2017/014649
§ 371 (c)(1),
(2) Date: Jul. 25, 2018

(87) PCT Pub. No.: WO2017/132106
PCT Pub. Date: Aug. 3, 2017

(65) Prior Publication Data
US 2019/0031811 A1 Jan. 31, 2019

Related U.S. Application Data

(60) Provisional application No. 62/404,393, filed on Oct. 5, 2016, provisional application No. 62/287,009, filed on Jan. 26, 2016.

(51) Int. Cl.
*C08G 18/10* (2006.01)
*C08G 18/62* (2006.01)
(Continued)

(52) U.S. Cl.
CPC ......... *C08G 18/10* (2013.01); *C08G 18/6204* (2013.01); *C08G 18/7671* (2013.01); *C08G 18/3206* (2013.01); *C08G 18/3271* (2013.01)

(58) Field of Classification Search
CPC ............ C08G 18/3271; C08G 18/6535; C08G 18/6204
See application file for complete search history.

(56) References Cited

U.S. PATENT DOCUMENTS 4,160,686 A * 7/1979 Niederdellmann .... C08G 18/10
156/239
4,569,952 A * 2/1986 Radovich ........... C08G 18/5033
252/182.25
(Continued)

OTHER PUBLICATIONS

PUBCHEM. Substance Record for SID 312138811; Feb. 23, 2016, pp. 1-7 [online] [retrieved on Dec. 5, 2017] Retrieved from the Internet <https://pubchem.ncbi.nlm.nih.gov/substance/312138811#section=top>, entire document.

*Primary Examiner* — Michael M Dollinger
(74) *Attorney, Agent, or Firm* — Renner Kenner Greive Bobak Taylor & Weber

(57) ABSTRACT

In one or more embodiments, the present invention provide a polyisobutylene-based polyurethane-urea, and related method of preparation, wherein PIB-diols form the soft segment and a diisocyanate along with a well-defined combinations low molecular weight diol chain extenders and amino alcohol as co-chain extenders form the hard segments. In one or more embodiments, the present invention is directed to the use of judiciously chosen chain extender/co-chain extender combinations to enhance the strength of PUs by partially replacing urethane groups with urea groups by the use of amino alcohols to improve strength, while maintaining good processability. These thermoplastic PIB-PUU (Continued)

elastomers exhibit heretofore unattainable combinations of mechanical properties and processability.

24 Claims, 10 Drawing Sheets

(51) Int. Cl.
    *C08G 18/76*     (2006.01)
    *C08G 18/32*     (2006.01)

(56) References Cited

U.S. PATENT DOCUMENTS

| | | | |
|---|---|---|---|
| 5,389,430 A * | 2/1995 | Yilgor | C08G 18/10 442/149 |
| 2003/0091818 A1* | 5/2003 | Banba | C08G 18/6204 428/343 |
| 2007/0190108 A1 | 8/2007 | Datta et al. | |
| 2010/0179298 A1 | 7/2010 | Faust et al. | |
| 2015/0038641 A1* | 2/2015 | Gobelt | B01F 17/0064 524/588 |
| 2015/0274876 A1* | 10/2015 | Faust | C08G 18/6204 525/123 |
| 2016/0008607 A1 | 1/2016 | Kane et al. | |

* cited by examiner

POLYISOBUTYLENE-BASED POLY(URETHANE-UREA)S

CROSS REFERENCE TO RELATED APPLICATIONS

This application claims the benefit of U.S. Provisional Patent Application Ser. No. 62/404,393 entitled "Polyisobutylene-Based Poly(Urethane-Urea)s," filed Oct. 5, 2016, and the benefit of U.S. Provisional Patent Application Ser. No. 62/287,009 entitled "Synthesis and Properties of PIS-Based Poly(urethane ureas)," filed Jan. 26, 2016, both of which are incorporated herein by reference in their entirety.

FIELD OF THE INVENTION

One or more embodiments of the present invention relates to a polyisobutylene-based polyurethane-urea (PIB-PUU). In certain embodiments, the present invention is directed to a melt processable PIB-PUU having improved mechanical properties.

BACKGROUND OF THE INVENTION

The excellent mechanical properties (particularly tensile strength and elongation) of commercially-available polyether-, polyester-, polycarbonate-, and polysiloxane-based polyurethanes (PUs) are largely due to their phase-separated micromorphology (precise arrangement of hard and soft segments) and extensive H bonding between —NH— donors and —C=O— acceptors in the hard segments. Polyisobutylene-based PUs (PIB-PUs), however, exhibit lesser mechanical properties than conventional PUs mainly because insufficient stress transfer between the highly segregated polar hard and apolar soft domains, and, importantly, insufficient H bonding between different segments.

A further fundamental difference between typical (commercially available) polyether-based PUs on the one hand, and PIS-based PUs on the other hand, is in respect to hydrolytic-oxidative-biological resistance: While the conventional polyether-based PUs are vulnerable to hydrolytic and oxidative damage (mainly on account of the many —$CH_2$—O— linkages they contain in the soft segment), PIB-PUs are chemically resistant as their soft segments contains only of highly stable —$CH_2$—$C(CH_3)_2$— units (See, Kennedy J. P, Ivan B., Designed Polymers by Carbocationic Macromolecular Engineering: Theory and Practice; Oxford University Press, New York, 1992, the disclosure of which is incorporated herein by reference in its entirety). The synthesis, characterization and properties of hydrolytically-oxidatively resistant PIS-PUs have been described and discussed together with the science and practical significance of their chemical stability/inertness (see, e.g., J. P. Kennedy, G. Erdodi, S. Jewrajka WO2010039986A1, J. P. Kennedy, G. Erdodi, J. Kang WO2011060161A1, Toth, K., Nugay, N. and Kennedy, J. P. (2015), J. Polym. Sci. Part A: Polym. Chem. 2015, xx, xxx, doi:10.1002/pola.27804, Erdodi, G.; Kang, J.; Kennedy, J. P. J Polym Sci Part A: Polym Chem 2010, 48, 2361-2371 and other parts of the series, the disclosures of which is incorporat3ed herein by reference in their entirety).

It is also well known that polyureas are typically stronger (exhibit higher tensile stresses) than polyurethanes because of the presence of stronger bifurcated H bonds in the former. FIGS. 1A-B show the structures of H bonds in polyurethanes (carbamates) (FIG. 1A) and polyureas (FIG. 1B).

The processibility of polyurethanes and polyureas is likewise fundamentally different. While polyurethanes are desirably melt processable, polyureas, on account of strong bifurcated H bonds, do not melt but degrade before melting. As a result, polyureas can only be solution processed by using strongly H-accepting environmentally objectionable solvents, (i.e., dimethyl acetamide, dimethyl formamide). One well known example of such a method is the dry spinning of spandex polyurea fibers from dimethyl formamide. In view of the use of noxious solvents, solution processibility of polyureas is costly, cumbersome, and environmentally unfriendly.

Accordingly, there is a need in the art for a PU that has enhanced mechanical properties, while maintaining the melt processibility of PUs in general and thermoplastic elastomeric PUs in particular.

SUMMARY OF THE INVENTION

In one or more embodiments, the present invention provide a polyisobutylene-based polyurethane-urea (PIB-PUU), and related method of preparation, wherein PIB-diols form the soft segment and a diisocyanate, such as methylene diphenyl diisocyanate (MDI), and a well-defined combinations of two kinds of chain extenders (e.g., a low molecular weight diol as chain extender and an amino alcohol as co-chain extenders) form the hard segments. In one or more embodiments, the present invention is directed to the use of judiciously chosen chain extender/co-chain extender (CE/co-CE) combinations to enhance the strength of PUs by partially replacing urethane groups with urea groups by the use of amino alcohols to improve strength, while maintaining good processability. These thermoplastic PIB-PUU elastomers exhibit heretofore unattainable combinations of mechanical properties and processability.

In a first aspect, the present invention is directed to a polyisobutylene-based polyurethane-urea composition comprising: one or more soft segments comprising the residue of a polyisobutylene polyol; and one or more hard segments comprising the residue of one or more diisocyanate and a chain extender combination comprising one or more low molecular weight diol chain extenders and one or more low molecular weight amino alcohol co-chain extenders.

In one or more of these embodiments, the polyisobutylene polyol is a polyisobutylene diol. In some of these embodiments, the polyisobutylene polyol has the formula:

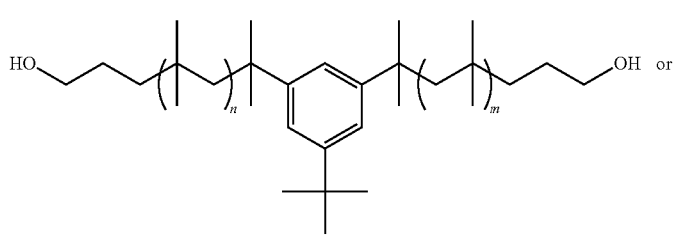

(I)

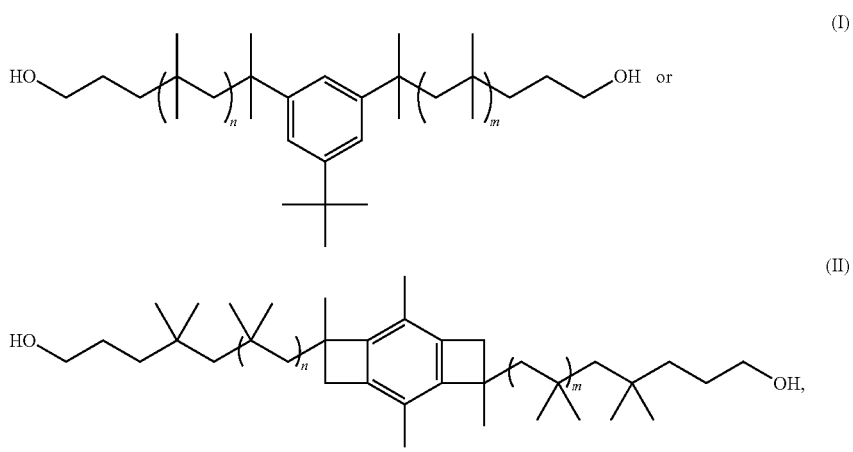

(II)

where n and m are each an integer from about 2 to about 5,000. In one or more embodiments, the polyisobutylene-based polyurethane-urea composition of the present invention includes any one or more of the above referenced embodiments of the first aspect of the present invention wherein the polyisobutylene polyol has a number average molecular weight of from 800 g/mol or more to 10,000 g/mol or less as measured by $^1$H NMR spectroscopy or gel permeation chromatography (GPC).

In one or more embodiments, the polyisobutylene-based polyurethane-urea composition of the present invention includes any one or more of the above referenced embodiments of the first aspect of the present invention wherein the diisocyanate is selected from the group consisting of 4,4'-methylenebis(phenyl isocyanate) (MDI), 4,4'-methylenebis(cyclohexyl isocyanate) (HMDI), isophorone diisocyanate, toluene diisocyanate (TDI) and combinations thereof. In one or more embodiments, the polyisobutylene-based polyurethane-urea composition of the present invention includes any one or more of the above referenced embodiments of the first aspect of the present invention wherein the diisocyanate is 4,4'-methylenebis(phenyl isocyanate) (MDI). In one or more embodiments, the polyisobutylene-based polyurethane-urea composition of the present invention includes any one or more of the above referenced embodiments of the first aspect of the present invention wherein the one or more low molecular weight diol chain extender is selected from the group consisting of short chain diols, 1,4-butane diol (BDO), hexamethylene diol (HDO), polytetrahydrofuran diol, and combinations thereof.

In one or more embodiments, the polyisobutylene-based polyurethane-urea composition of the present invention includes any one or more of the above referenced embodiments of the first aspect of the present invention wherein the one or more low molecular weight amino alcohol co-chain extender comprises a $C_2$-$C_{10}$ chain having a terminal hydroxyl group and a terminal amine group. In one or more embodiments, the polyisobutylene-based polyurethane-urea composition of the present invention includes any one or more of the above referenced embodiments of the first aspect of the present invention wherein the one or more low molecular weight amino alcohol co-chain extender is selected from the group consisting of 2-amino ethanol, 3-amino propanol, 4-amino butanol, 6-amino hexanol, and combinations thereof.

In one or more embodiments, the polyisobutylene-based polyurethane-urea composition of the present invention includes any one or more of the above referenced embodiments of the first aspect of the present invention wherein the one or more low molecular weight amino alcohol co-chain extender comprises from about 0.1 weight percent to about 10 weight percent of said chain extender combination. In one or more embodiments, the polyisobutylene-based polyurethane-urea composition of the present invention includes any one or more of the above referenced embodiments of the first aspect of the present invention wherein the one or more low molecular weight diol chain extender is 1,4-butane diol, and the one or more low molecular weight amino alcohol co-chain extender is 4-amino butanol. In one or more embodiments, the polyisobutylene-based polyurethane-urea composition of the present invention includes any one or more of the above referenced embodiments of the first aspect of the present invention wherein the molar ratio of 1,4-butane diol to 4-amino butanol is 4:1.

In one or more embodiments, the polyisobutylene-based polyurethane-urea composition of the present invention includes any one or more of the above referenced embodiments of the first aspect of the present invention having a number average molecular weight of from 1,000 g/mol or more to 100,000 g/mol or less as measured by $^1$H NMR spectroscopy or gel permeation chromatography (GPC). In one or more embodiments, the polyisobutylene-based polyurethane-urea composition of the present invention includes any one or more of the above referenced embodiments of the first aspect of the present invention having a creep compliance of from about 110 μm$^2$/N, 10$^{-3}$ or more to about 170 μm$^2$/N, 10$^3$ or less. In one or more embodiments, the polyisobutylene-based polyurethane-urea composition of the present invention includes any one or more of the above referenced embodiments of the first aspect of the present invention having a storage modulus (E') of from about 5,000 MPa to about 5,700 MPa. In one or more embodiments, the polyisobutylene-based polyurethane-urea composition of the present invention includes any one or more of the above referenced embodiments of the first aspect of the present invention having a strain recovery of from about 90% to about 95.

In one or more embodiments, the polyisobutylene-based polyurethane-urea composition of the present invention includes any one or more of the above referenced embodiments of the first aspect of the present invention having a microshore hardness of from about 70 to about 90. In one or more embodiments, the polyisobutylene-based polyurethane-urea composition of the present invention includes any one or more of the above referenced embodiments of the first aspect of the present invention having a tensile strength of from about 15 MPa to about 35 MPa. In one or more embodiments, the polyisobutylene-based polyurethane-urea composition of the present invention includes any one or more of the above referenced embodiments of the first aspect of the present invention having a tensile strain of from about 300% to about 700%. In one or more embodiments, the polyisobutylene-based polyurethane-urea composition of the present invention includes any one or more of the above referenced embodiments of the first aspect of the present invention having a strain recovery of from about 90% to about 95%.

In one or more embodiments, the polyisobutylene-based polyurethane-urea composition of the present invention includes any one or more of the above referenced embodiments of the first aspect of the present invention having a melting temperature ($T_m$) of from about 165° C. to about 185° C. In one or more embodiments, the polyisobutylene-based polyurethane-urea composition of the present invention includes any one or more of the above referenced embodiments of the first aspect of the present invention having a flow temperature (Td of from about 133° C. to about 145° C. In one or more embodiments, the polyisobutylene-based polyurethane-urea composition of the present invention includes any one or more of the above referenced embodiments of the first aspect of the present invention wherein said composition is melt processable. In one or more embodiments, the polyisobutylene-based polyurethane-urea composition of the present invention includes any one or more of the above referenced embodiments of the first aspect of the present invention having from about 4 mole % to about 99 mole % urea linkages. In another embodiment, 100 mole % urea linkages can be used, but it will be appreciated that this would be a polyurea composition.

In one or more embodiments, the polyisobutylene-based polyurethane-urea composition of the present invention includes any one or more of the above referenced embodiments of the first aspect of the present invention having the formula:

the polyisobutylene polyol; y is a mole percentage of the low molecular weight diol chain extenders; v is a mole percentage of the amino-alcohol co-chain extenders; and x+y+v=1.

In a second aspect, the present invention is directed to a polyisobutylene-based polyurethane-urea composition comprising the reaction product of a polyisobutylene diol having a number average molecular weight of from 800 g/mol or more to 10,000 g/mol or less as measured by $^1$H NMR spectroscopy or gel permeation chromatography (GPC); one or more diisocyanate selected from the group consisting of 4,4'-methylenebis(phenyl isocyanate) (MDI), 4,4'-methylenebis(cyclohexyl isocyanate) (HMDI), isophorone diisocyanate, toluene diisocyanate (TDI) and combinations thereof; one or more low molecular weight diol chain extender selected from the group consisting of short chain diols, 1,4-butane diol (BDO), hexamethylene diol (HDO), polytetrahydrofuran diol, and combinations thereof; and one or more low molecular weight amino alcohol co-chain extender comprises a $C_2$-$C_{10}$ chain having a terminal hydroxyl group and a terminal amine group.

In one or more embodiments, the polyisobutylene-based polyurethane-urea composition of the present invention includes any one or more of the above referenced embodiments of the first or second aspect of the present invention having improved mechanical properties compared to the corresponding polyisobutylene-based polyurethane composition. In one or more embodiments, the polyisobutylene-based polyurethane-urea composition of the present invention includes any one or more of the above referenced embodiments of the second aspect of the present invention wherein said polyisobutylene-based polyurethane-urea composition is melt processable.

BRIEF DESCRIPTION OF THE DRAWINGS

For a more complete understanding of the features and advantages of the present invention, reference is now made to the detailed description of the invention along with the accompanying figures in which.

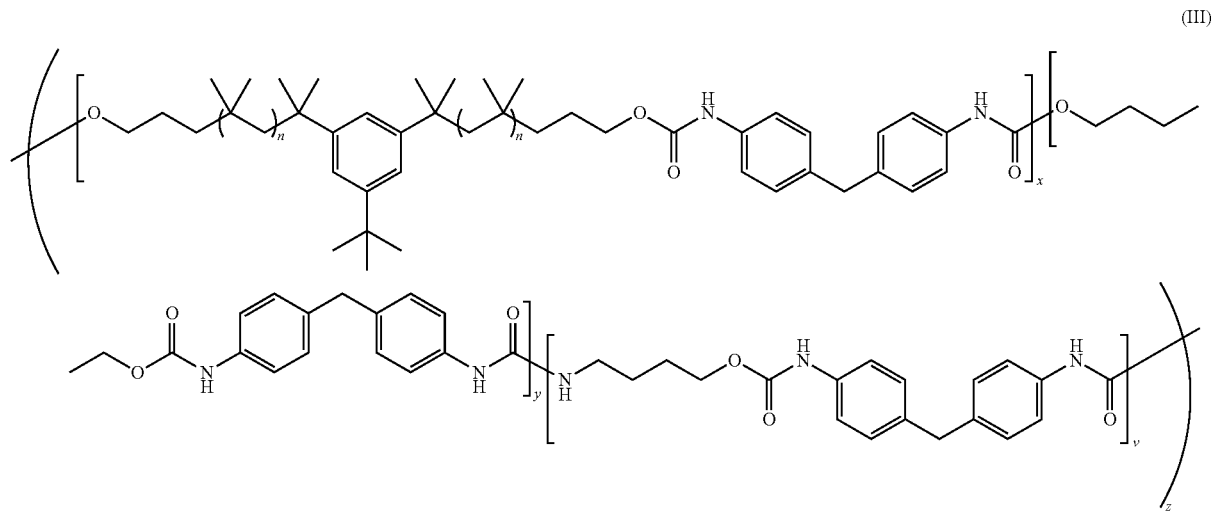

(III)

Figure 2A:
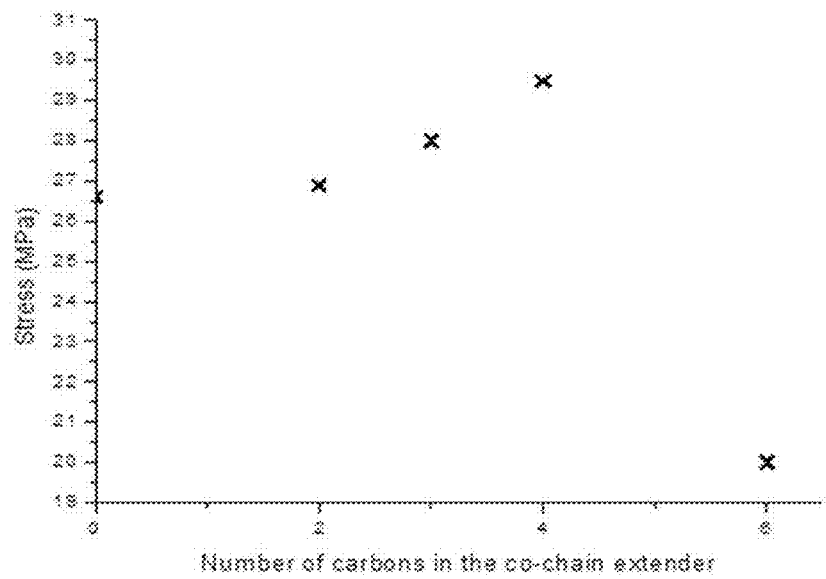
Figure 2B:
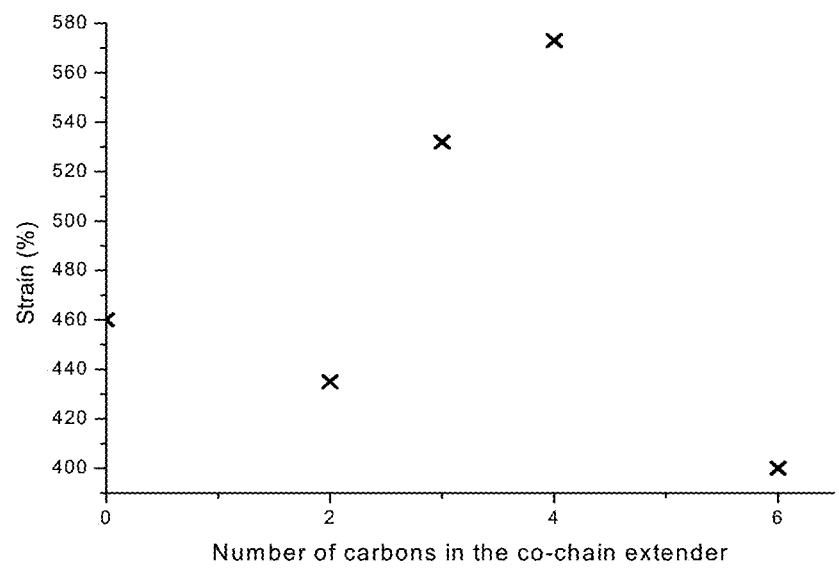

where each n is an integer from about 2 to 5,000; z is an integer from about 2 to 1,000,000; x is a mole percentage of FIGS. 2A-B are graphs showing ultimate stress (FIG. 2A) and strain data (FIG. 2A) for PIB-PUUs according to embodiments of the present invention made with various co-CEs (80/20 mole % BDO/co-CE).

Figure 3:
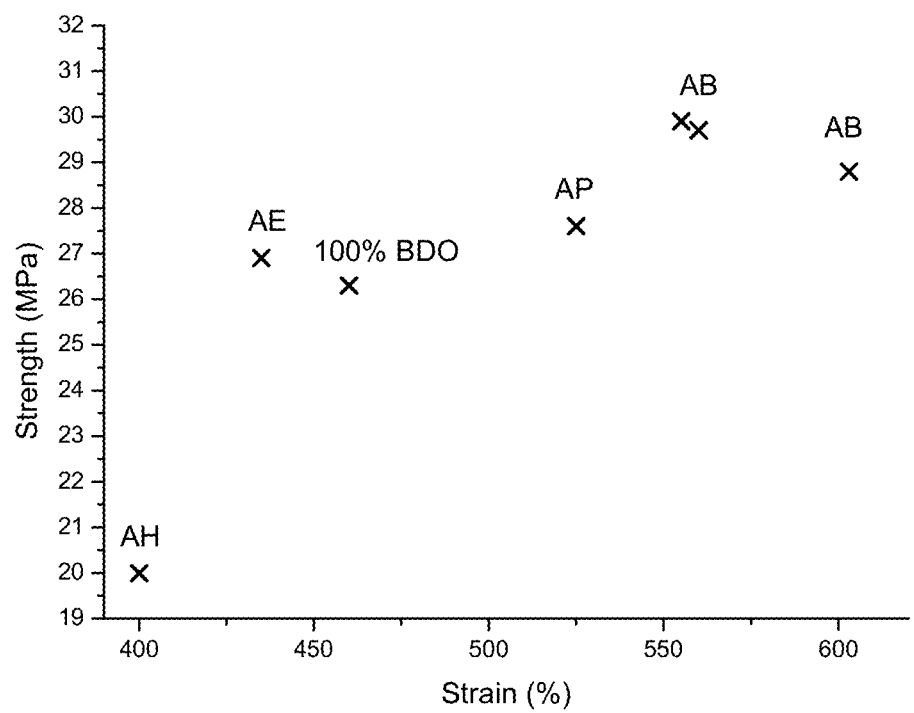

FIG. 3 is a graph showing Ultimate Stress/strain data obtained with various co-CEs (BDO/Co-CE=80/20 mole %)

Figure 4A:
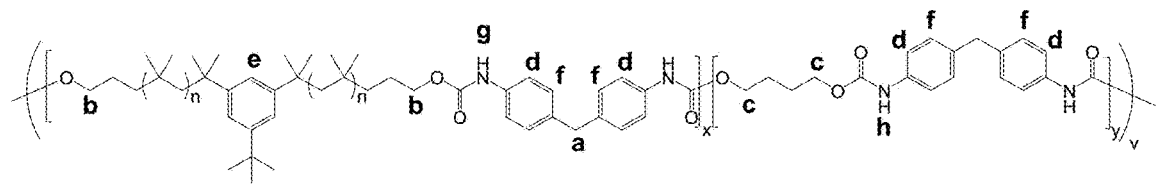
Figure 4B:
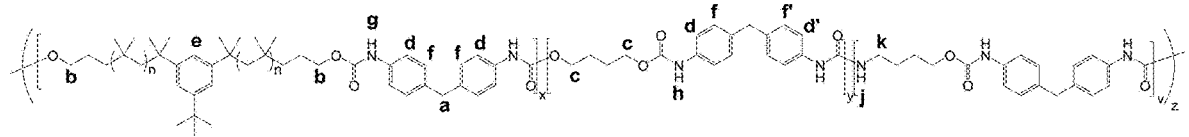
Figure 4C:
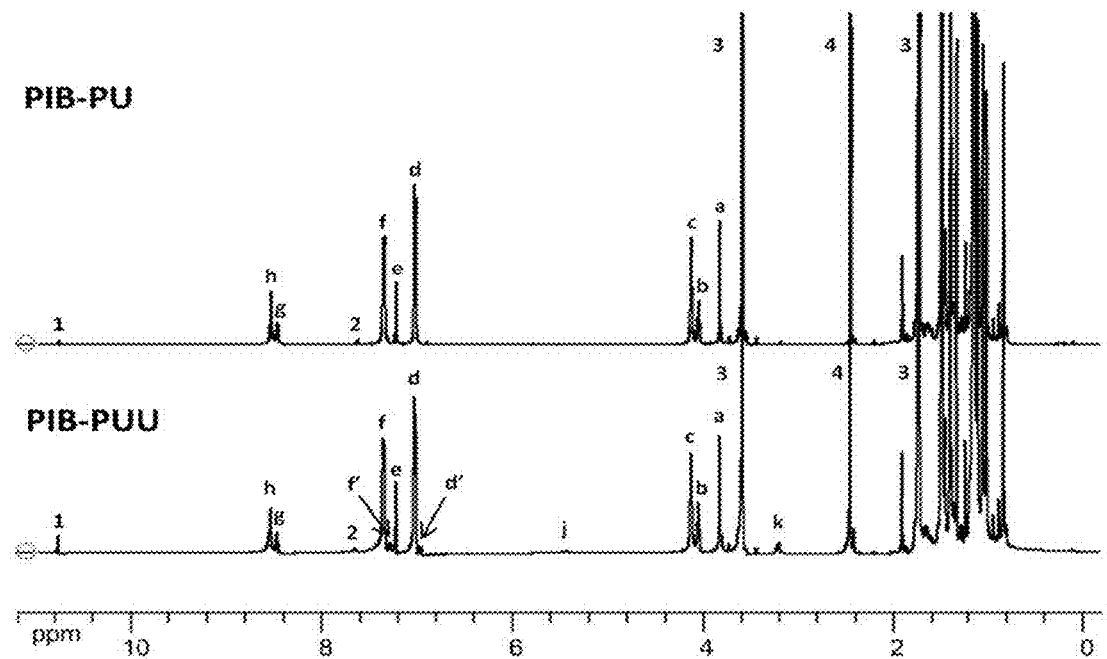

FIGS. 4A-C Structures of PIB-PU (FIG. 4A) and PIB-PUU (FIG. 4B), used for $^1$H-NMR assignments in (FIG. 4C). FIG. 4C shows $^1$H-NMR spectra with peak assignments for a PIB-PU made with 72.5 wt % HO-PIS-OH, MDI and BDO (upper), and a PIB-PUU made with 72.5 wt % HO-PIS-OH, MDI and BDO/AB=80/20 mole % (lower). Numbered peaks indicate: (1) N$\underline{H}$ of allophanate bonds, (2) N$\underline{H}$ of urea bonds formed due to the presence of moisture, (3) residual solvent, (4) water. Resonances in the 0-2 ppm range are due to aliphatic protons of PIS and BDO.

Figure 5A:
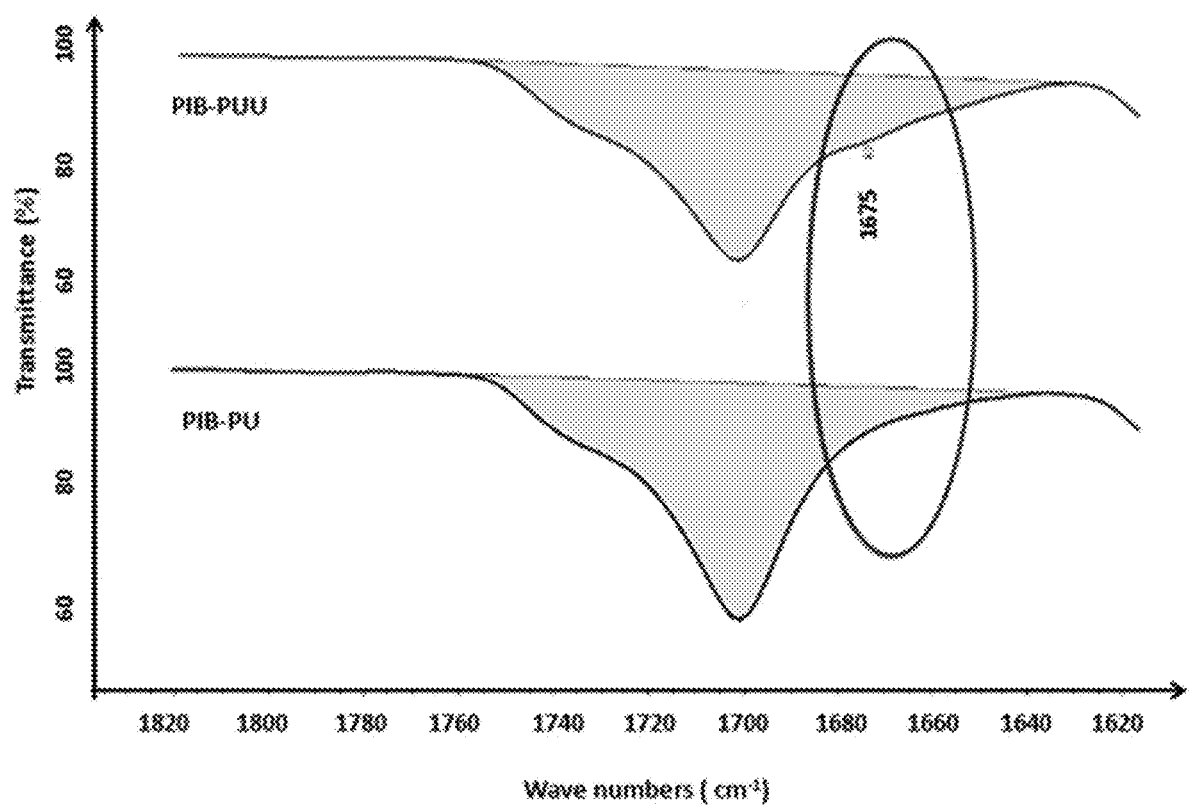
Figure 5B:
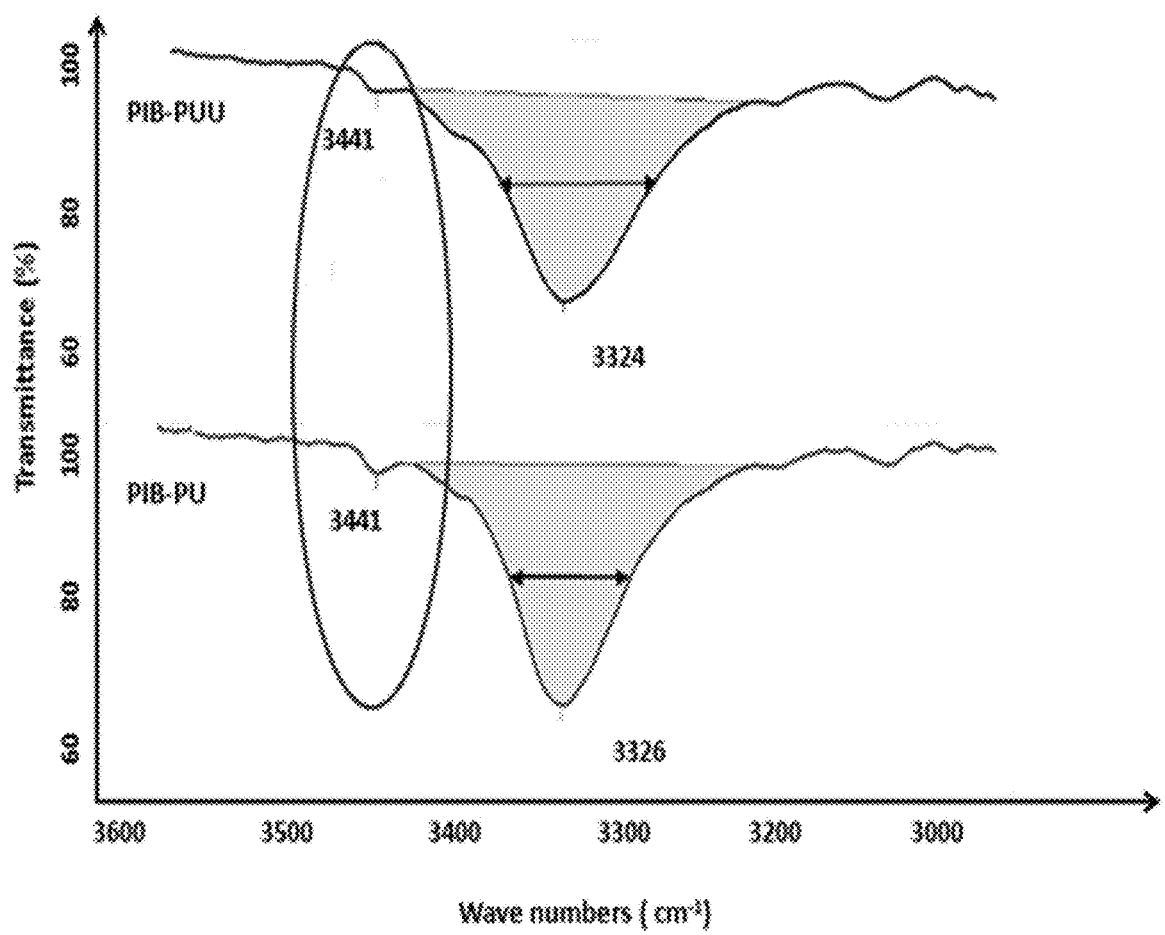

FIGS. 5A-B are Fourier transform infrared spectroscopy (FTIR) spectra of PIB-PU and PIB-PUU in the 1600-1800 cm$^{-1}$ (FIG. 5A), and 3100-3600 cm$^{-1}$ ranges (FIG. 5B). The circles focus at regions discussed.

Figure 6:
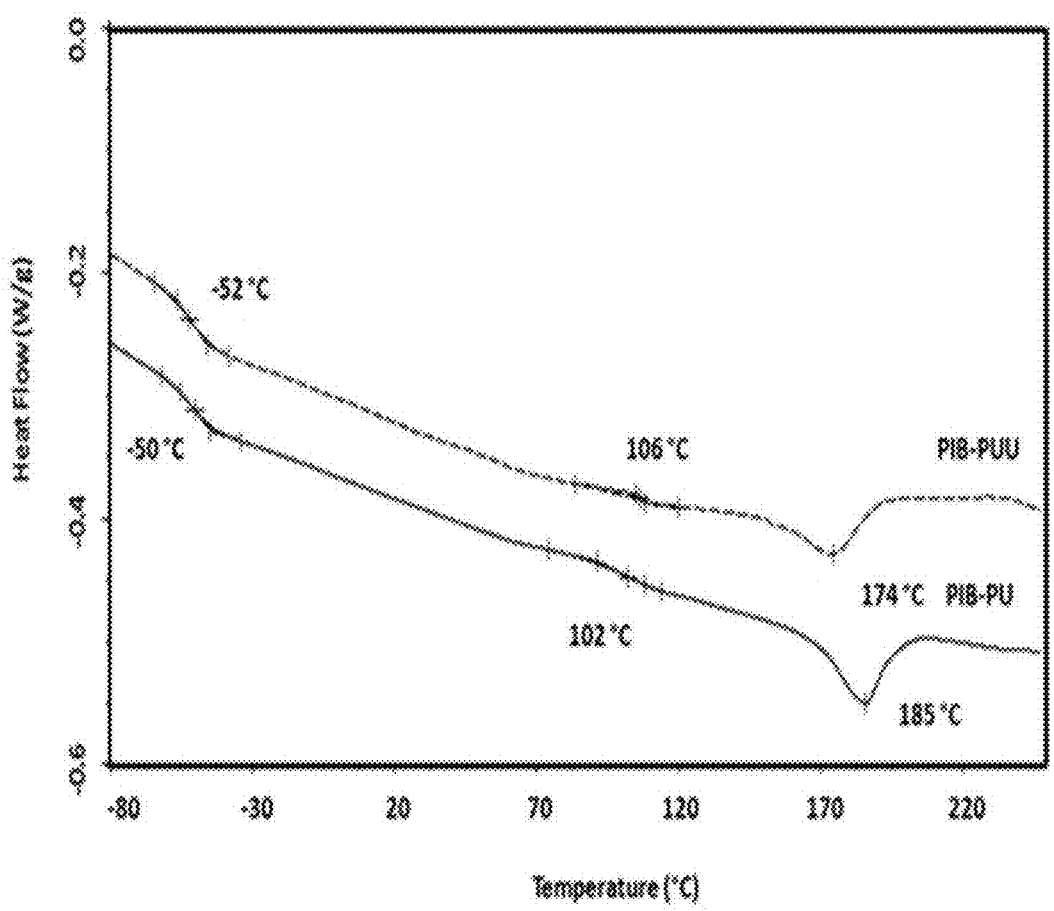

FIG. 6 is a chart showing differential scanning calorimetry (DSC) traces of PIB-PU made with BDO (Table 1, Example 1), and PIB-PUU made with BDO/AB=80/20 mole % (Table 1, Example 7).

Figure 7:
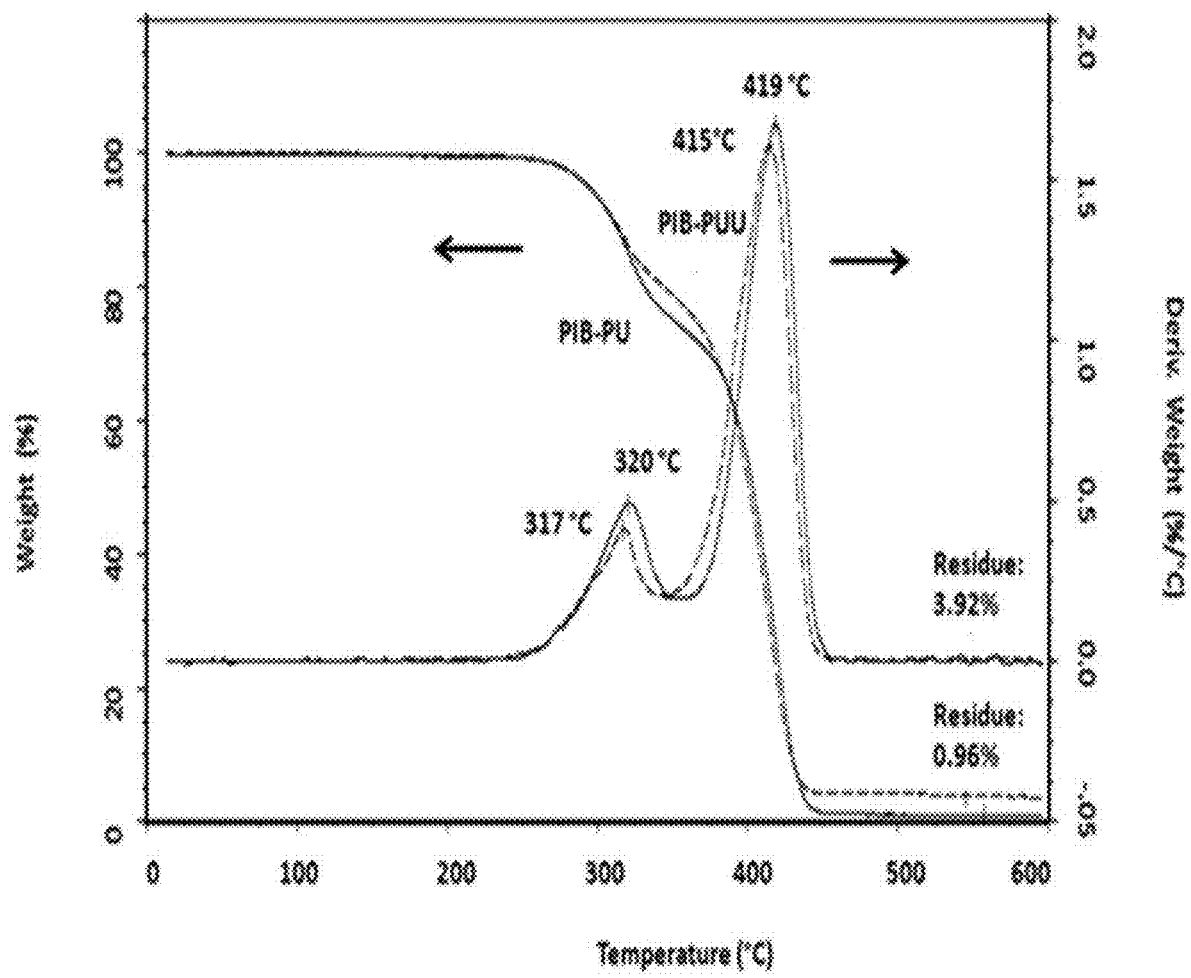

FIG. 7 is a diagram showing TGA and DTGA thermograms of PIB-PU made with BDO, and PIB-PUU made with 80/20 mole % BDO/AB.

Figure 8:
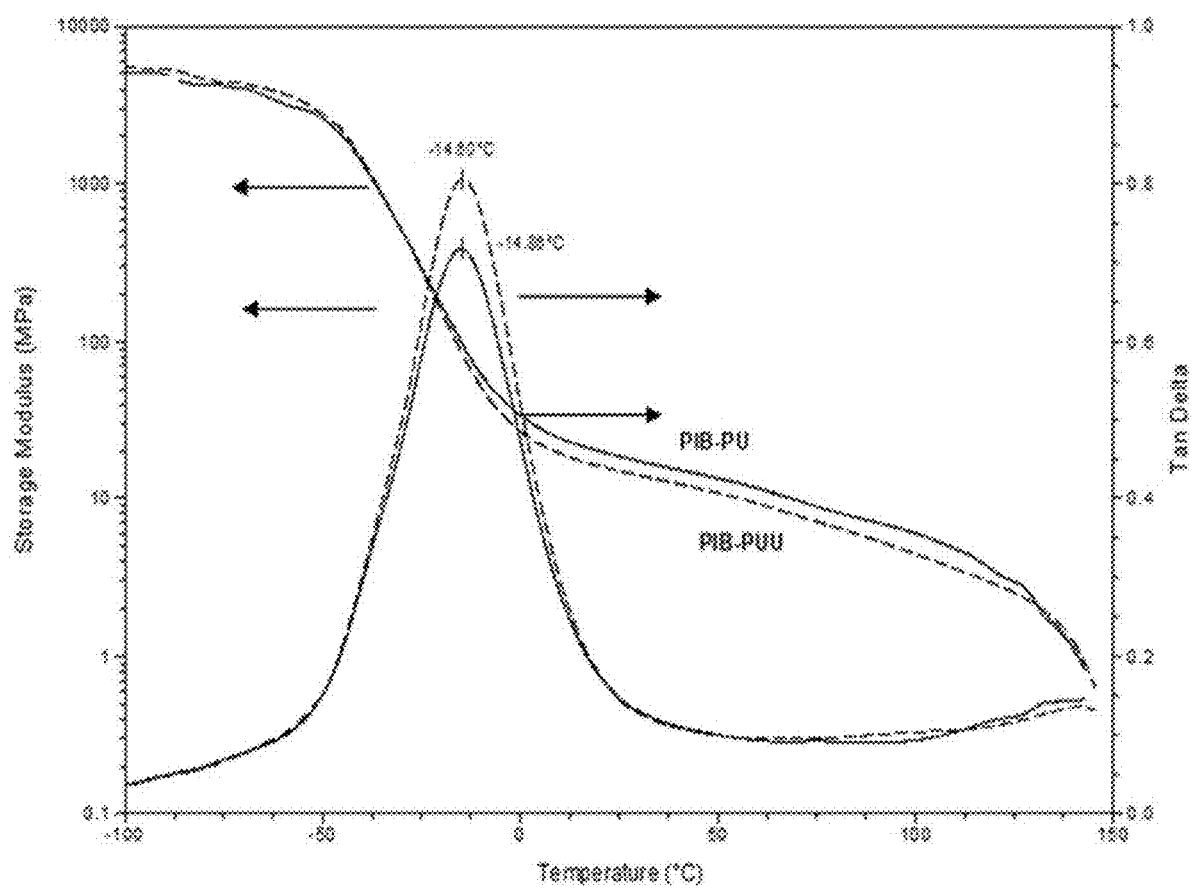

FIG. 8 is a graph showing the storage modulus (E') and tan delta traces of PIB-PU made with BDO, and PIB-PUU made with 80/20 mole % BDO/AB.

Figure 9:
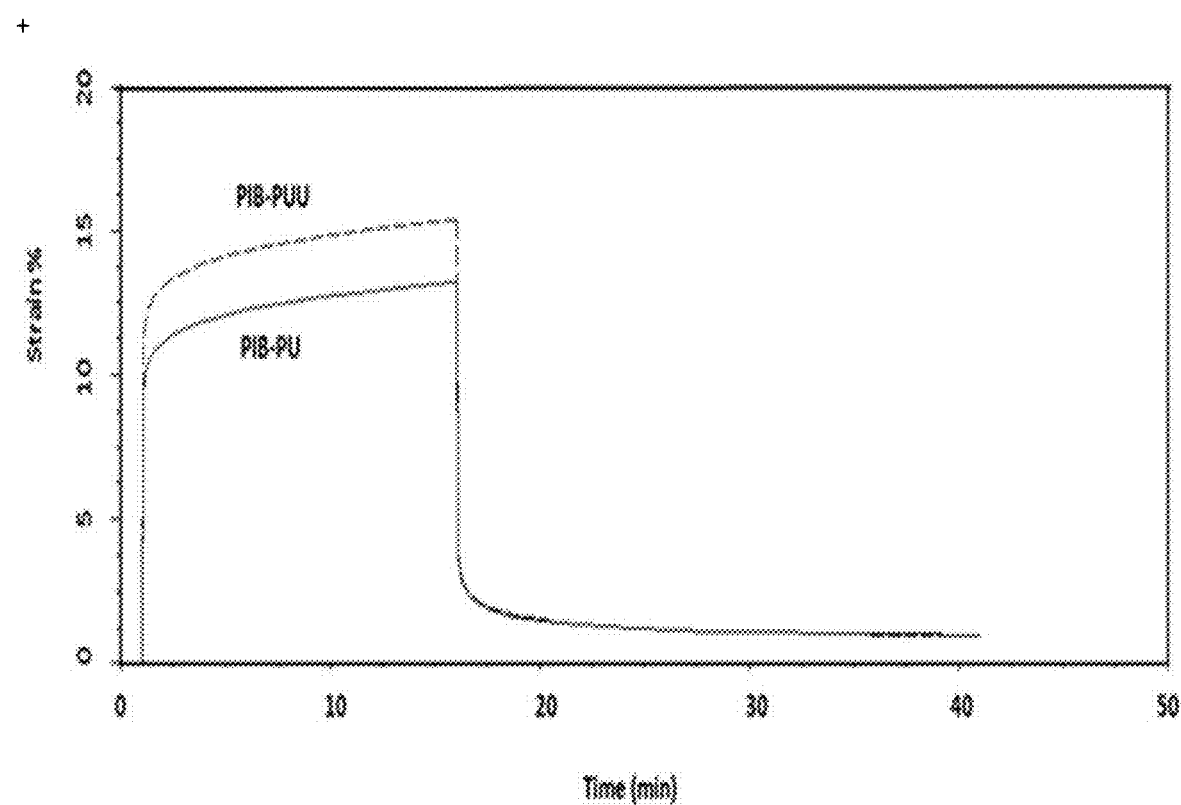

FIG. 9 is a chart showing Creep Compliance and Strain Recovery vs time for PIB-PU (made with BDO), and PIB-PUU (made with 80/20 mole % BDO/AB).

DETAILED DESCRIPTION OF THE ILLUSTRATIVE EMBODIMENTS

In a first aspect, the present invention provides a polyisobutylene-based polyurethane also having a controlled number of urea linkages. As they have both urethane (carbamate) and urea linkages, these polymers are referred to herein as polyisobutylene-based polyurethane urea polymers (PIS-PUUs). In one or more embodiments, these PIS-PUUs are prepared by the use of PIS-based polyols, preferably PIS-diols, for the soft segment and a diisocyanate, such as methylene diphenyl diisocyanate (MDI) plus well-defined combinations of two kinds of chain extenders (e.g., a low molecular weight diol as chain extender and an amino alcohol as co-chain extenders) for the hard segments. In one or more embodiments, the present invention is directed to the use of judiciously chosen chain extender/co-chain extender (CE/co-CE) combinations to enhance the strength of PUs by partially replacing urethane groups with urea groups by the use of amino alcohols, while maintaining good processibility. These thermoplastic PIS-PUU elastomers exhibit heretofore unattainable combinations of mechanical properties and processibility. In one or more embodiments, the polyisobutylene-based polyurethane-urea (PIS-PUU) of the present invention incorporates the residue of the PIS-diol used to form the PIS-PUU.

In one or more embodiments, the PIS diols may comprise a central core connecting two telechelic isobutylene chains of from about 2 to about 5,000 isobutylene units, each having chain having a terminal OH group. In some embodiments, each of the isobutylene chains may have 10 or more isobutylene units, in other embodiments, 100 or more isobutylene units, in other embodiments, 1000 or more isobutylene units, in other embodiments, 1,500 or more isobutylene units, in other embodiments, 2,000 or more isobutylene units, and in other embodiments, 2,500 or more isobutylene units. In some embodiments, each of the isobutylene chains may have 4,500 or less isobutylene units, in other embodiments, 4,000 or less isobutylene units, in other embodiments, 3,500 or less isobutylene units, in other embodiments, 3000 or less isobutylene units, and in other embodiments, 2,500 or less isobutylene units. Here, as well as elsewhere in the specification and claims, individual range limits can be combined to form alternative non-disclosed range limits.

As will be appreciated by those of skill in the art, the core of the PIS-diol may be the residue of the initiator used to form the PIS-diol by cationic polymerization. (See e.g. U.S. Pat. Nos. 8,552,118 and 9,359,465; U.S. Published Patent Application No. 2015/0191566; and International Patent Application No. WO 2010/039986, the disclosures of which are incorporated herein by reference). The structure of the core of the PIS-diol is not particularly limited and may include, without limitation, the structure of those initiators disclosed in U.S. Pat. Nos. 5,733,998 and 8,889,926, the disclosures of which are incorporated herein by reference.

In one or more embodiments, used to form the PIS-diol may have the formula:

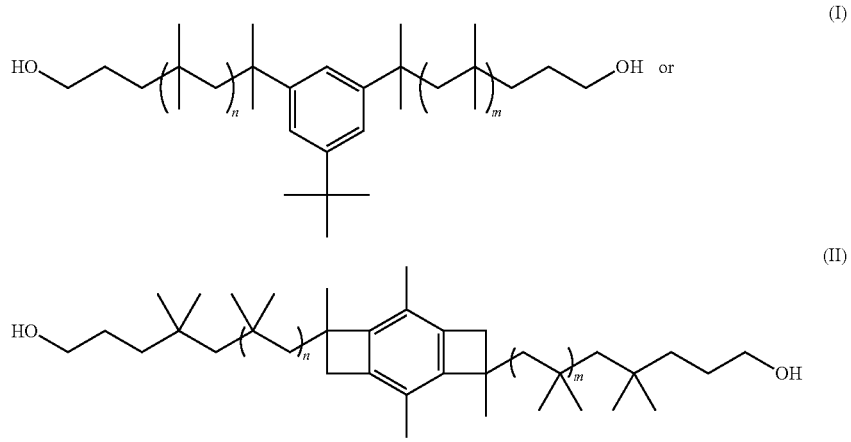

wherein n and m are each an integer from about 2 to about 5,000. In one or more embodiments, n is an integer from 2 to about 5,000, or from about 7 to about 4,500, or from about 10 to about 4,000, or from about 15 to about 3,500, or from about 25 to about 3,000, or from about 75 to about 2,500, or from about 100 to about 2,000, or from about 250 to about 1,500, or even from about 500 to about 1,000. In one or more embodiments, m is an integer from 2 to about 5,000, or from about 7 to about 4,500, or from about 10 to about 4,000, or from about 15 to about 3,500, or from about 25 to about 3,000, or from about 75 to about 2,500, or from about 100 to about 2,000, or from about 250 to about 1,500, or even from about 500 to about 1,000.

In various embodiments, the PIS diols used to form the PIB-PUUs of the present invention may have a weight average molecular weight of from about 500 g/mol or more to about 600,000 g/mol or less as measured by $^1$H NMR spectroscopy or gel permeation chromatography (GPC). In some embodiments, the PIB-PUUs of the present invention may have a weight average molecular weight of 1,000 g/mol or more, in other embodiments, 10,000 g/mol or more, in other embodiments, 100,000 g/mol or more, in other embodiments, 200,000 g/mol or more, in other embodiments, 300,000 g/mol or more, and in other embodiments, 400,000 g/mol or more. In some embodiments, the PIB-PUUs of the present invention may have a weight average molecular weight of 550,000 g/mol or less, in other embodiments, 500,000 g/mol or less, in other embodiments, 450,000 g/mol or less, in other embodiments, 400,000 g/mol or less, in other embodiments, 350,000 g/mol or less, in other embodiments, 300,000 g/mol or less, and in other embodiments, 250,000 g/mol or less.

As will be appreciated by those of skill in the art, residues of these PIB diols will form the soft segments of the PIB-PUUs of the present invention and may comprise from about 50 to about 95 weight percent of the final PIB-PUU by weight. In one or more embodiment, the PIB-PU residues may comprise from about 50 to about 85 weight percent of the PIB-PUUs of the present invention. In some other embodiments, the PIB-PU residues may comprise from about 50 to about 75 weight percent of the PIB-PUUs of the present invention. In some other embodiments, the PIB-PU residues may comprise from about 55 to about 85 weight percent of the PIB-PUUs of the present invention. In some other embodiments, the PIB-PU residues may comprise from about 65 to about 75 weight percent of the PIB-PUUs of the present invention.

Suitable PIB diols may be synthesized using any method known in the art for that purpose. In some embodiments, suitable PIB diols may be synthesized using methods set forth in U.S. Pat. Nos. 8,552,118 and 9,359,465; U.S. Published Patent Application No. 2015/0191566; and International Patent Application No. WO 2010/039986, and a co-pending PCT Application filed Jan. 20, 2017, entitled "Novel Initiators for Living Carbocationic Polymerization," the disclosures of which are incorporated herein by reference in their entirety.

The PIB-PUUs of the present invention further incorporates the residue of the diisocyanates used in their formation. The diisocyanate used to form the PIB-PUUs of the present invention is not particularly limited and may include any diisocyanates generally used in the formation of polyurethanes. Suitable diisocyanates are well known in the art and may include, without limitation, 4,4'-methylenebis(phenyl isocyanate) (MDI), 4,4'-methylenebis(cyclohexyl isocyanate) (HMDI), isophorone diisocyanate (IPDI), toluene disocyanates (TDI) many aliphatic and aromatic diisocyanates could be added that is known to the art or combinations thereof.

As set forth above, it is believed that residues of these diisocyanates, together with the chain extenders described below, form the hard segments of the PIB-PUUs of the present invention. In one or more embodiments, the diisocyanates may comprise from about 10 weight percent to about 40 weight percent of the final PIB-PUU. In some other embodiments, these diisocyanates may comprise from about 15 weight percent to about 35 weight percent of the final PIB-PUU. In some other embodiments, these diisocyanates may comprise from about 18 to about 30 weightpercent of the final PIB-PUU. In some other embodiments, these diisocyanates may comprise from about 20 weight percent to about 50 weight percent of the final PIB-PUU. In some other embodiments, these diisocyanates may comprise from about 20 weight percent to about 25 weight percent of the final PIB-PUU Finally, the PIB-PUUs of the present invention will also comprise residues of the combination of low molecular weight diol chain extenders and amino-alcohol co-chain extenders used in their formation. In one or more embodiment, the low molecular weight diol chain extenders will have two hydroxyl functional groups and a number average molecular weight of from about 50 g/mol to about 1000 g/mol as measured by $^1$H NMR spectroscopy or gel permeation chromatography (GPC), or calculated based upon the atomic weight of its constituent atoms. In some other embodiments, the low molecular weight diol chain extenders will have a molecular weight of from about 100 g/mol to about 500 g/mol. In some other embodiments, the low molecular weight diol chain extenders will have a average molecular weight of from about 50 g/mol to about 250 g/mol. Suitable low molecular weight diol chain extenders may include, without limitation, short chain diols, 1,4-butane diol (BDO), tetramethylene diol, hexamethylene diol (HDO), poly(tetrahydrofurandiol), or combinations thereof. As used herein, the term "short chain diol" refers to diols containing up to six $CH_2$ groups.

In one or more embodiment, these low molecular weight diol chain extenders may comprise from about 1 mole percent to about 25 mole percent of the total amount of chain extenders (the low molecular weight diol chain extenders plus the amino-alcohol co-chain extenders) used to form the PIB-PUUs of the present invention. In some other embodiments, low molecular weight diol chain extenders may comprise from about 70 mole percent to about 90 mole percent of the total amount of chain extenders used to form the PIB-PUUs of the present invention. In some other embodiments, low molecular weight diol chain extenders may comprise from about 75 mole percent to about 85 mole percent of the total amount of chain extenders used to form the PIB-PUUs of the present invention. In some other embodiments, low molecular weight diol chain extenders may comprise from about 78 mole percent to about 83 mole percent of the total amount of chain extenders used to form the PIB-PUUs of the present invention. In some other embodiments, low molecular weight diol chain extenders may comprise about 80 mole percent of the total amount of chain extenders used to form the PIB-PUUs of the present invention.

In various embodiments, the low molecular weight diol chain extenders comprise from about 1.0 mole percent to about 20 mole percent of the PIB-PUUs of the present invention. In some embodiments, the low molecular weight diol chain extenders comprise from about 1.0 mole percent to about 15 mole percent, in other embodiments from about 1.0 mole percent to about 10 mole percent, in other embodiments from about 5.0 mole percent to about 20 mole percent, in other embodiments from about 10 mole percent to about 20 mole percent, and in other embodiments from about 5.0 mole percent to about 15 mole percent of the PIB-PUUs of the present invention.

As set forth above, the PIB-PUUs of the present invention also contain amine-alcohol co-chain extenders, which create a controllable number of urea linkages in the polymer, giving it improved mechanical properties while maintaining good processablity. In various embodiments, amino-alcohol co-chain extenders may comprise a relatively low molecular weight alkyl alcohol having a terminal amine group. In some embodiments, the amino-alcohol co-chain extenders will have a molecular weight (number average) of from about 50 g/mol to about 300 g/mol as measured by $^1$H NMR spectroscopy or gel permeation chromatography (GPC), or calculated based upon the atomic weight of its constituent atoms. In some embodiments, the amino-alcohol co-chain extenders will have a molecular weight of from about 60 g/mol to about 250 g/mol. In some embodiments, the amino-alcohol co-chain extenders will have a molecular weight of from about 80 g/mol to about 200 g/mol. In some embodiments, the amino-alcohol co-chain extenders will have average molecular weight of from about 100 g/mol to about 2000 g/mol.

In one or more embodiments, the amino-alcohol co-chain extenders may comprise a linear $C_2$ to $C_{10}$ chain having a terminal hydroxyl group and a terminal amine group. In one or more embodiments, the amino-alcohol co-chain extenders may be, without limitation, 2-amino ethanol, 3-amino propanol, 4-amino butanol, 6-amino hexanol, or combinations thereof.

In one or more embodiment, these amino-alcohol co-chain extenders may comprise from about 10 mole percent to about 25 mole percent of the total amount of chain extenders (the low molecular weight diol chain extenders plus the amino-alcohol co-chain extenders) used to form the PIB-PUUs of the present invention. In some embodiments, these amino-alcohol co-chain extenders may comprise from about 10 mole percent to about 25 mole percent of the total amount of chain extenders used to form the PIB-PUUs of the present invention. In some other embodiments, these amino-alcohol co-chain extenders may comprise from about 15 mole percent to about 25 mole percent of the total amount of chain extenders used to form the PIB-PUUs of the present invention. In some other embodiments, these amino-alcohol co-chain extenders may comprise from about 18 mole percent to about 23 mole percent of the total amount of chain extenders used to form the PIB-PUUs of the present invention. In one or more embodiments, the amino-alcohol co-chain extenders comprise about 20 mole percent of the total amount of chain extenders used to form the PIB-PUUs of the present invention. In one or more embodiments, 4-amino butanol comprises about 20 mole percent of the total amount of chain extenders used to form the PIB-PUUs of the present invention.

In some embodiments, the low molecular weight amino alcohol co-chain extender comprises from about 0.1 weight percent to about 10 weight percent of the total amount of chain extenders in the chain extender combination. In some embodiments, the low molecular weight amino alcohol co-chain extender comprises from about 0.1 weight percent to about 10 weight percent, in other embodiments, from about 1.0 weight percent to about 10 weight percent, in other embodiments, from about 5.0 weight percent to about 10 weight percent, in other embodiments, from about 0.1 weight percent to about 7.0 weight percent, in other embodiments, from about 0.1 weight percent to about 5.0 weight percent of total amount of chain extenders.

In various embodiments, the amino-alcohol co-chain extenders comprise from about 2 mole percent to about 20 mole percent of the PIB-PUUs of the present invention. In some embodiments, the amino-alcohol co-chain extenders comprise from about 4 mole percent to about 20 mole percent, in other embodiments from about 8 mole percent to about 20 mole percent, in other embodiments from about 10 mole percent to about 20 mole percent, in other embodiments from about 2 mole percent to about 15 mole percent, and in other embodiments from about 2 mole percent to about 10 mole percent of the PIB-PUUs of the present invention.

In various embodiments, the low molecular weight diol chain extenders and amino-alcohol co-chain extenders together comprise from about 20 mole percent to about 45 mole percent of the PIB-PUUs of the present invention. In some embodiments, the total amount of chain extenders in the PIB-PUUs of the present invention (the low molecular weight diol chain extenders plus the amino-alcohol co-chain extenders) constitutes 25 mole percent or more of the PIB-PUU. In some other embodiments, the total amount of chain extenders in the PIB-PUUs of the present invention constitutes 28 mole percent or more, in other embodiments 30 mole percent or more, in other embodiments 32 mole percent or more, in other embodiments 35 mole percent or more, and in other embodiments 40 mole percent or more of the PIB-PUU. In some embodiments, the total amount of chain extenders in the PIB-PUUs of the present invention constitutes 43 mole percent or less of the PIB-PUU. In some other embodiments, the total amount of chain extenders in the PIB-PUUs of the present invention constitutes 40 mole percent or less, in other embodiments 38 mole percent or less, in other embodiments 33 mole percent or less, in other embodiments 30 mole percent or less, in other embodiments 28 mole percent or less, and in other embodiments 25 mole percent or less of the PIB-PUU.

In one or more embodiment, the PIB-PUUs of the present invention will have a number average molecular weight of from about 1000 g/mol or more to about 100,000 g/mol or less. In one or more embodiments, the PIB-PUUs of the present invention will have a number average molecular weight of 1,000 g/mol or more, in other embodiments, 5,000 g/mol or more, in other embodiments, 10,000 g/mol or more, in other embodiments, 25,000 g/mol or more, in other embodiments, 40,000 g/mol or more, and in other embodiments, 50,000 g/mol or more. In one or more embodiments, the PIB-PUUs of the present invention will have a number average molecular weight of 90,000 g/mol or less, in other embodiments, 80,000 g/mol or less, in other embodiments, 70,000 g/mol or less, in other embodiments, 60,000 g/mol or less, in other embodiments, 50,000 g/mol or less, and in other embodiments, 40,000 g/mol or less.

In one or more embodiment, the PIB-PUUs of the present invention will have a mole percentage of urea linkages of from about 4% to about 10%. In some embodiments, mole percentage of urea linkages may be 5% or more, in other embodiments, 6% or more, in other embodiments, 7% or more, in other embodiments, 8% or more, in other embodiments, 8.5% or more, and in other embodiments, 9% or more. In some embodiments, mole percentage of urea linkages may be 9.5% or less, in other embodiments, 9% or less, in other embodiments, 8.5% or less, in other embodiments, 8% or less, in other embodiments, 7.5% or less, in other embodiments, 6.5% or less, and in other embodiments, 6% or less.

In one or more embodiments, the PIB-PUUs of the present invention may have the formula:

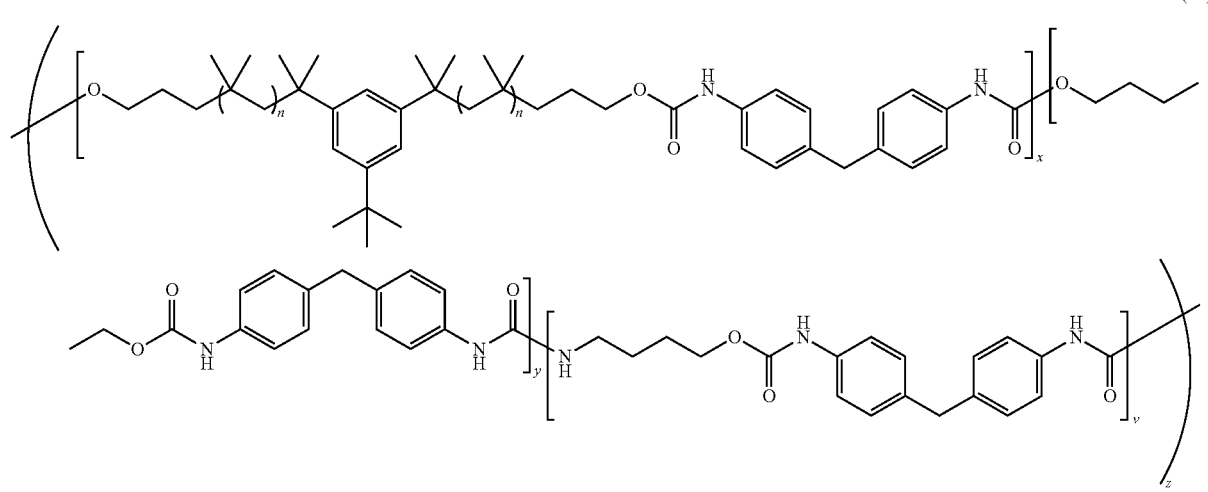

(III)

wherein each n is an integer from about 2 to 5,000; x is a mole percentage of PIS diol, y is a mole percentage of low molecular weight diol chain extenders, v is a mole percentage of amino-alcohol co-chain extenders, wherein x+y+v=1; and z is an integer from about 2 to 1,000,000. In one or more of these embodiments, each n may be 100 or more, in other embodiments, 500 or more, in other embodiments, 1000 or more, in other embodiments, 1500 or more, in other embodiments, 3000 or more, and in other embodiments, 4000 or more. In one or more of these embodiments, n may be 4,500 or less, in other embodiments, 4,000 or less, in other embodiments, 3,500 or less, in other embodiments, 3,000 or less, in other embodiments, 2,500 or less, and in other embodiments, 2,000 or less. In one or more of these embodiments, z may be 100 or more, in other embodiments, 1,000 or more, in other embodiments, 50,000 or more, in other embodiments, 100,000 or more, in other embodiments, 200,000 or more, in other embodiments, 300,000 or more, in other embodiments, 400,000 or more, and in other embodiments, 500,000 or more. In one or more of these embodiments, z may be 900,000 or less, in other embodiments, 800,000 or less, in other embodiments, 700,000 or less, in other embodiments, 600,000 or less, in other embodiments, 500,000 or less, and in other embodiments, 400,000 or less.

In one or more of these embodiments, x may be 40 mole % or more, in other embodiments, 50 mole % or more, in other embodiments, 60 or more, in other embodiments, 70 mole % or more, in other embodiments, 80 mole % or more, and in other embodiments, 90 mole % or more. In one or more of these embodiments, x may be 97 mole % or less, in other embodiments, 90 mole % or less, in other embodiments, 85 mole % or less, in other embodiments, 80 mole % or less, in other embodiments, 75 mole % or less, in other embodiments, 70 mole % or less, and in other embodiments, 65 mole % or less.

In one or more of these embodiments, y may be 1 mole % mole % or more, in other embodiments, 5 mole % or more, in other embodiments, 10 mole % mole % or more, in other embodiments, 12 mole % mole % or more, in other embodiments, 15 mole % or more, and in other embodiments, 18 mole % mole % or more. In one or more of these embodiments, y may be 25 mole % or less, in other embodiments, 20 mole % or less, in other embodiments, 18 mole % or less, in other embodiments, 15 mole % or less, in other embodiments, 10 mole % or less, and in other embodiments, 5 mole % or less. In one or more of these embodiments, v may be 2 mole % mole % or more, in other embodiments, 4 mole % or more, in other embodiments, 10 mole % or more, in other embodiments, 12 or more, in other embodiments, 15 mole % or more, and in other embodiments, 18 mole % or more. In one or more of these embodiments, v may be 25 mole % mole % or less, in other embodiments, 20 mole % mole % or less, in other embodiments, 18 mole % or less, in other embodiments, 15 mole % or less, in other embodiments, 10 mole % or less, and in other embodiments, 5 mole % or less.

As set forth above, in various embodiments the PIB-PUUs of the present invention have improved mechanical properties compared to the corresponding PIB-PU. As used herein, a "corresponding" PIB-PU for a particular PIB-PUU is a PIB-PU having the identical composition except for the type of chain extenders used. The "corresponding" PIB-PU has the same overall mole percent of chain extenders and the PIB-PUU in question except that all of the chain extenders used are the same low molecular weight diol chain extender used in the PIB-PUU and no amine-alcohol chain extenders are used. As used herein, the term "improved mechanical properties" refers to enhanced tensile strength and elongation. Thus, the PIB-PUUs of the present invention will have a higher tensile strength and toughness that the tensile strength of and toughness of a corresponding PIB-PU. Likewise, the PIB-PUUs of the present invention will have a higher elongation than the elongation of a corresponding PIB-PU. Moreover, in a vibrating medium, PIB-PUU will be an effective damper over a much broader temperature range than PIB-PU. In one or more embodiment, the PIB-PUUs of the present invention will have a tensile strength of from about 15 MPa to about 35 MPa, as measured by tensometer. In some embodiments, the tensile strength of the PIB-PUUs of the present invention may be 18 MPa or more, in other embodiments, 20 MPa or more, in other embodiments, 23 MPa or more, in other embodiments, 25 MPa or more, in other embodiments, 26 MPa or more, and in other embodiments, 28 MPa or more. In some embodiments, the tensile strength of the PIB-PUUs of the present invention may be 33 MPa or less, in other embodiments, 30 MPa or less, in other embodiments, 29 MPa or less, in other embodiments, 28 MPa or less, in other embodiments, 27 MPa or less, in other embodiments, 26 MPa or less, and in other embodiments, 25 MPa or less.

In one or more embodiment, the PIB-PUUs of the present invention will have a tensile strain of from about 300% to about 700%, as measured by tensometer. In some embodiments, the tensile strain of the PIB-PUUs of the present invention may be 350% or more, in other embodiments, 400% or more, in other embodiments, 450% or more, in other embodiments, 500% or more, in other embodiments, 550% or more, and in other embodiments, 600% or more. In some embodiments, the tensile strain of the PIB-PUUs of the present invention may be 650% or less, in other embodiments, 600 or less, in other embodiments, 580% or less, in other embodiments, 550% or less, in other embodiments, 530% or less, in other embodiments, 500% or less, and in other embodiments, 400% or less.

In one or more embodiment, the PIB-PUUs of the present invention will have microshore (ASTM D-2240) hardness of from about 70 to about 90, using ASTM D2240-15, Standard Test Method for Rubber Property—Durometer Hardness, ASTM International, West Conshohocken, Pa., 2015, the disclosure of which is incorporated herein by reference in its entirety. The Microshore scale is essentially identical to Shore A scale in the range investigated. In some embodiments, the hardness (microshore) of the PIB-PUUs of the present invention may be 73 or more, in other embodiments, 75 or more, in other embodiments, 78 or more, in other embodiments, 80 or more, in other embodiments, 83 or more, and in other embodiments, 85 or more. In some embodiments, the hardness (microshore) of the PIB-PUUs of the present invention may be 88 or less, in other embodiments, 85 or less, in other embodiments, 83 or less, in other embodiments, 80 or less, in other embodiments, 77 or less, in other embodiments, 75 or less, and in other embodiments, 73 or less.

In one or more embodiment, the PIB-PUUs of the present invention will have creep compliance of from about 110 $\mu m^2/N$, $10^{-3}$ ($110 \times 10^3$ $\mu m^2/N$), or more to about 170 $\mu m^2/N$, $10^{-3}$ or less, as measured by tensometer. In some embodiments, the creep compliance of the PIB-PUUs of the present invention may be 120 or more, in other embodiments, 130 $\mu m^2/N$, $10^{-3}$ or more, in other embodiments, 140 $\mu m^2/N$, $10^{-3}$ or more, in other embodiments, 150 $\mu m^2/N$, $10^{-3}$ or more, in other embodiments, 155 $\mu m^2/N$, $10^{-3}$ or more, and in other embodiments, 160 $\mu m^2/N$, $10^{-3}$ or more. In some embodiments, the creep compliance of the PIB-PUUs of the present invention may be 165 $\mu m^2/N$, $10^{-3}$ or less, in other embodiments, 160 $\mu m^2/N$, $10^{-3}$ or less, in other embodiments, 155 $\mu m^2/N$, $10^{-3}$ or less, in other embodiments, 150 $\mu m^2/N$, $10^{-3}$ or less, in other embodiments, 145 $\mu m^2/N$, $10^{-3}$ or less, in other embodiments, 140 $\mu m^2/N$, $10^{-3}$ or less, and in other embodiments, 130 $\mu m^2/N$, $10^{-3}$ or less.

In one or more embodiment, the PIB-PUUs of the present invention will have storage modulus (E') of from about 5,000 MPa to about 5,700 MPa, as measured by tensometer. In some embodiments, the storage modulus (E') of the PIB-PUUs of the present invention may be 5,050 MPa or more, in other embodiments, 5,100 MPa or more, in other embodiments, 5,200 MPa or more, in other embodiments, 5,250 MPa or more, in other embodiments, 5,300 MPa or more, and in other embodiments, 5,350 MPa or more. In some embodiments, the storage modulus (E') of the PIB-PUUs of the present invention may be 56,50 MPa or less, in other embodiments, 5,600 MPa or less, in other embodiments, 5,550 MPa or less, in other embodiments, 5,500 MPa or less, in other embodiments, 5,450 MPa or less, in other embodiments, 5,400 MPa or less, and in other embodiments, 5,350 MPa or less.

In one or more embodiment, the PIB-PUUs of the present invention will have strain recovery of from about 90% to about 95%, as measured by tensometer. In some embodiments, the strain recovery of the PIB-PUUs of the present invention may be 91% or more, in other embodiments, 92% or more, in other embodiments, 93% or more, and in other embodiments, 94% or more In some embodiments, the strain recovery of the PIB-PUUs of the present invention may be 94% or less, in other embodiments, 93% or less, in other embodiments, 92% or less, and in other embodiments, 91% or less.

In one or more embodiment, the PIB-PUUs of the present invention will have permanent set of from about 0.97% to about 0.99% as measured by tensometer. In some embodiments, the permanent set of the PIB-PUUs of the present invention may be 0.973% or more, in other embodiments, 0.976% or more, in other embodiments, 0.98% or more, in other embodiments, 0.982% or more, and in other embodiments, 0.984% or more. In some embodiments, the strain recovery of the PIS-PUUs of the present invention may be 0.988% or less, in other embodiments, 0.986% or less, in other embodiments, 0.984% or less, in other embodiments, 0.982% or less, in other embodiments, 0.980% or less, in other embodiments, 0.978% or less, and in other embodiments, 0.975% or less.

As set forth above, despite the improvement in their mechanical properties, the PIB-PUUs of the present invention remain melt processable, having glass transition temperatures ($T_g$), melting temperatures ($T_m$), and flow temperatures (T) that are comparable with those of their corresponding PIB-PUs. As used herein, the term "melt processable" refers to a polymer that does not appreciably degrade before melting or undergo any degradation before melting. Any degradation is de minimus. In one or more embodiment, the PIB-PUUs of the present invention will have a glass transition temperature ($T_g$) of from about 45° C. to about 65° C. as measured by differential scanning calorimetry (DSC). In some embodiments, the $T_g$ of the PIB-PUUs of the present invention may be 48° C. or more, in other embodiments, 50° C. or more, in other embodiments, 53° C. or more, in other embodiments, 55° C. or more, in other embodiments, 58° C. or more, and in other embodiments, 60° C. or more. In some embodiments, the $T_g$ of the PIB-PUUs of the present invention may be 63° C. or less, in other embodiments, 60° C. or less, in other embodiments, 57° C. or less, in other embodiments, 55° C. or less, in other embodiments, 53° C. or less, in other embodiments, 50° C. or less, and in other embodiments, 48° C. or less.

In one or more embodiment, the PIB-PUUs of the present invention will have a melting temperature ($T_m$) of from about 174° C. to about 185° C. as measured by differential scanning calorimetry (DSC). In some embodiments, the $T_m$ of the PIS-PUUs of the present invention may be 175° C. or more, in other embodiments, 176° C. or more, in other embodiments, 177° C. or more, in other embodiments, 178° C. or more, in other embodiments, 179° C. or more, and in other embodiments, 180° C. or more. In some embodiments, the $T_m$ of the PIB-PUUs of the present invention may be 182° C. or less, in other embodiments, 180° C. or less, in other embodiments, 184° C. or less, in other embodiments, 183° C. or less, in other embodiments, 182° C. or less, in other embodiments, 181° C. or less, and in other embodiments, 180° C. or less.

In one or more embodiments, the PIB-PUUs of the present invention will have a temperature of flow ($T_f$) of from about 133° C. to about 145° C. as measured by DMTA using a dynamic mechanical analyzer. In some embodiments, the $T_f$ of the PIS-PUUs of the present invention may be 135° C. or more, in other embodiments, 137° C. or more, in other embodiments, 138° C. or more, in other embodiments, 139° C. or more, in other embodiments, 140° C. or more, and in other embodiments, 142° C. or more. In some embodiments, the $T_f$ of the PIB-PUUs of the present invention may be 143° C. or less, in other embodiments, 142° C. or less, in other embodiments, 140° C. or less, in other embodiments, 139° C. or less, in other embodiments, 138° C. or less, in other embodiments, 137° C. or less, and in other embodiments, 136° C. or less.

In various embodiments, the PIB-PUUs of the present invention will have a degradation temperature ($T_d$) that is greater than their melting temperatures as described above. As used herein, the term "degradation temperature" ($T_d$) as applied to polymers refers to the temperature at which a polymer begins to chemically decompose and is shown as the peak max in DTGA thermogram (right scale on TGA thermogram) of the polymer.

In addition, it is believed that the higher char residue in the PIB-PUU of the present invention (3.92%) compared to the corresponding PIB-PU (0.92%), indicates better flame retardant properties. PIB-PUU produces surprisingly larger amounts (more than three times) of carbonaceous char than PIB-PU.

In a second aspect, the present invention includes novel methods of making the PIB-PUUs described above. By way of general outline, in various embodiments the PIB-PUUs of the present invention may be prepared by first forming a pre-polymer comprising the PIB diol, and the diisocyanate, (using a catalyst), and then adding the diol chain extender, followed by the amine alcohol chain extender to create the PIB-PUU. In some embodiments, the PIB-PUUs of the present invention may be formed using the same methods described in U.S. Pat. Nos. 8,552,118, 8,674,034, and 9,359,465; U.S. Published Patent Application Nos. 2013/0331538 and 2015/0191566; and International Patent Application No. WO 2010/039986, the disclosures of which are incorporated herein by referenced in their entirety, for synthesis of PIB-PUs from HO-PIB-OH, except that amine alcohol co-chain extenders are added in place of some portion of the HO-PIB-OH and after the HO-PIB-OH has been added.

In one or more embodiments, the process begins by placing one of the diisocyanates described above in a suitable reaction vessel and dissolving it in an appropriate solvent. Selection of a suitable reaction vessel is a routine matter for one of skill in the art, and need not be discussed further. In some embodiments, the diisocyanate may be dissolved in a bottom flask equipped with a Teflon-coated stirring bar. Solvents for the diisocyanates described above are well known and one of ordinary skill in the art will be able to select an appropriate solvent without undue experimentation. In one or more embodiments, MDI is the diisocyante and it is dissolved in THF. Next, one of the PIB diols described above is dissolved in a suitable solvent and added to the MDI solution in an inert atmosphere. Again, one of ordinary skill in the art will be able to select an appropriate solvent without undue experimentation. In one or more embodiments, the selected PIB diol is dissolved in THF and added to the MDI solution under a blanket of nitrogen gas.

Next, the mixture is heated to a temperature of from 60° C. to 70° C. and a catalyst is added. The catalyst is not particularly limited and may be any catalyst known in the art and commonly used for polyurethane synthesis, including, but not limited to, dibutyltin laurate (DBTDL), acidic and basic amines, oxides, mercaptides, triethylenediamine (TEDA), dimethylethyanolamine (DMEA), dimethylcyclohexamine (DMCHA). Finally, the mixture is stirred for from about 45 to about 75 min, to form the prepolymer. In some embodiments, the mixture is heated to a temperature of 65° C., DBTDL catalyst was added and the system was stirred for about 1 hour to produce the prepolymer.

In one or more embodiments, one of the low molecular weight diol chain extenders described above is then dissolved in a suitable solvent in a deoxygenated atmosphere and the mixture is stirred for from about 20 to about 40 min at a temperature of from 60° C. to 70° C. Again, one of ordinary skill in the art will be able to select an appropriate solvent for of the low molecular weight diol chain extenders described above without undue experimentation. In some embodiments, a solution of BDO in THF is prepared, injected into the prepolymer solution and the mixture stirred for 0.5 h at 65° C.

Finally, one of the amine alcohol co-chain extenders described above is dissolved in a suitable solvent and added to the polymer mixture. Here again, one of ordinary skill in the art will be able to select an appropriate solvent for of the amine alcohol co-chain extenders described above without undue experimentation. The mixture is stirred for a period of from about 2 hours to about 3 hours, and the solvent evaporated to produce the PIB-PUU polymer of the present invention. In some embodiments, the polymer may then be dried in a vacuum oven. In some of these embodiments, the polymer may then be dried in a vacuum oven at 60° C. for about 1 day.

As the reactivity of $-NH_2$ is much higher with isocyanates than that of $-OH$, the $-NH_2$ group of the amino alcohol will react much before the $-OH$ group, and reproducible PUs can only be obtained by maintaining precise $HO-(CH_2)_4-OH/NH_2-(CH_2)_4-OH=80/20$ mole % (94.3/5.7 urethane/urea mole %) stoichiometry. Experiments have shown that even a minor deviation from this stoichiometry may reduce mechanical properties.

Further, because the large reactivity difference between $-NH_2$ and $-OH$ groups, the properties of PIB-PUUs prepared by the use of amino alcohols are affected by the mixing sequence of reagents and manner of reagent addition (i.e., adding premixed CE/Co-CE combinations, adding the CE and Co-CE separately first adding the Co-CE followed by the CE or vice versa, varying the time of reagent introductions, dropwise slow addition or rapid addition, etc.). Best mechanical properties were obtained by first adding the $HO-(CH2)4-OH$ to PIS diol/MDI/catalyst "prepolymer" mixtures, and ~30 mins later introducing the $NH_2-(CH_2)_4-OH$.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Materials

The source and purification of most materials used herein have been described in Toth, K., Nugay, N. and Kennedy, J. P., J. Polym. Sci. Part A: Polym. Chem. 2016, 54, 532-543, the disclosure of which is incorporated herein by reference. 2-Amino-1-ethanol (AE) and 6-amino-1-hexanol (AH) were purchased from Sigma-Aldrich and used without further purification. 3-amino-1-propanol (AP) and 4-amino-1-butanol (AB) (Sigma-Aldrich) were stored over 3 Å molecular sieves prior to use. Poly(tetramethylene oxide) of $M_n$~4000 g/mol (PTMO-1000) was purchased from Sigma Aldrich and dried for 2 hours at 60° C. under vacuum prior to use.

Example 1

Based upon previous work showing the strength of PIB-PUs prepared with HO—$(CH_2)_4$—OH (see, Toth, K., Nugay, N. and Kennedy, J. P., J. Polym. Sci. Part A: Polym. Chem. 2016, 54, 532-543, the disclosure of which is incorporated herein by reference in its entirety), experiments were conducted with HO—$(CH_2)_4$—OH/$NH_2$—$(CH_2)_4$—OH combinations, i.e., with the $C_4$ CE/co-CE combination. The structures of HO—$(CH_2)_4$—OH and $NH_2$—$(CH_2)_4$—OH are very similar, differing only in one terminal functional group. Further experiments were performed with a variety of other amino alcohols.

In addition, orienting experiments were carried out to determine the relative HO—$(CH_2)_4$—OH/$NH_2$—$(CH_2)_4$—OH concentrations in syntheses, so as to obtain PIB-PUU films containing various HO—$(CH_2)_4$—OH/$NH_2$—$(CH_2)_4$—OH ratios suitable for testing. We found that optically clear (i.e., homogenous) PIB-PUU films can be cast using less than ~20-25 mole % $NH_2$—$(CH_2)_4$—OH relative to HO—$(CH_2)_4$—OH (i.e., with 94.3/5.7 urethane/urea mole % stoichiometry). With more than ~20-25 mole % $NH_2$-$(CH_2)_4$—OH relative to HO—$(CH_2)_4$—OH films become hazy (which indicates macroscopic heterogeneity) unsuitable for testing.

A series of optically clear PIB-PUU films were prepared by the use of amino ethanol (AE), amino propanol (AP), amino butanol (AB), and amino hexanol (AH) as co-CEs under otherwise identical conditions, and their stress/strain properties were determined. The synthesis of a PIB-PUU (best mode) prepared with AB, using BDO/AB=80/20 mole % (92.2/7.8 mole % urethane/urea), was as follows: Into a well-dried 25 mL round bottom flask equipped with a Teflon-coated stirring bar containing distilled MDI (0.4745 g, 1.896 mmol) dissolved in 1 mL THF was injected OH-PIS-OH (1.5056 g, 0.503 mmol) dissolved in THF (4 mL) under a blanket of $N_2$. The solution was heated to 65° C., DBTDL catalyst (1.2 mg, 0.0019 mmol; 0.24 mL of 5 mg/mL THF solution) was added and the system was stirred 1 h to produce the 'prepolymer'. Separately, in a deoxygenated vial a solution of BDO (0.0937 g, 1.040 mmol) in THF (1.5 mL) was prepared and syringed to the prepolymer solution, and the mixture was stirred for another 0.5 h at 65° C. Then a THF (1.5 mL) solution of AB (0.0229 g, 0.257 mmol) was added and the mixture was stirred 2.5 hours. The system was diluted with ~2 mL THF and the still warm solution was poured into a 7×7 cm glass mold. The solvent was evaporated in a hood and the sample dried at 60° C. in a vacuum oven for 1 day. An optically clear transparent slightly yellow ~300 μm thick film was obtained. Table 1 summarizes the ingredients and their concentrations employed in this series of experiments.

TABLE 1

Ingredients and their concentrations used in Examples

| Example | PIB (g/mmol) | MDI (g/mmol) | BDO (CE) (g/mmol) | co-CE (g/mmol) | CE/co-CE (mole %/%) | Urethane/urea (mole %/%) |
|---|---|---|---|---|---|---|
| 1 | 6.007/2.002 | 1.910/7.63 | 0.474/5.26 | — | 100/0 | 100/0.0 |
| 2 | 1.507/0.502 | 0.482/1.93 | 0.090/1.0 | AE 0.016/0.27 | 75/25 | 90.9/9.1 |
| 3 | 1.506/0.502 | 0.480/1.92 | 0.0963/1.07 | AE 0.016/0.27 | 80/20 | 92.7/7.3 |
| 4 | 1.509/0.503 | 0.478/1.91 | 0.0946/1.05 | AP 0.020/0.26 | 80/20 | 92.8/7.2 |
| 5 | 1.507/0.502 | 0.477/1.90 | 0.089/0.99 | AP 0.025/0.38 | 75/25 | 90.9/9.1 |
| 6 | 1.501/0.474 | 0.474/1.89 | 0.089/0.98 | AB 0.029/0.33 | 75/25 | 90.1/9.9 |
| 7 | 1.506/0.503 | 0.475/1.900 | 0.094/1.04 | AB 0.023/0.26 | 80/20 | 92.8/7.2 |
| 8 | 1.509/0.503 | 0.475/1.90 | 0.100/1.10 | AB 0.017/0.20 | 85/15 | 94.6/5.4 |
| 9 | 1.505/0.502 | 0.476/1.90 | 0.089/0.98 | AB 0.030/0.33 | 75/25 | 91.0/9.0 |
| 10 | 1.505/0.502 | 0.469/1.88 | 0.093/1.04 | AH 0.259/0.030 | 80/20 | 92.8/7.2 |
| 11* | 1.501/1.501 | 0.544/2.17 | 0.041/0.45 | AB 0.010/0.11 | 80/20 | 97.3/2.7 |

*Example 11 was made with PTMO-1000 soft segment.

Example 2

Stress-strain traces for Samples 1-11 of Example 1 were generated by an Instron Model 5543 Universal Tester controlled by Series Merlin 3.11 software. A bench top die (ASTM D638 type V) was used to cut dumbbells from cast films. Samples (25 mm long, 3.1 mm width at the neck) were tested to failure at a crosshead speed of 25 mm/min at room temperature. Averages of at least three measurements are reported.

In addition, the microshore hardness of Samples 1-11 of Example 1 was determined using ~2 mm thick samples (piled of ~0.3 mm thick films) by a Micro-O-Ring Hardness Tester (see, ASTM D-2240-15, the disclosure of which is incorporated herein by reference in its entirety). As set forth above, the Microshore scale is essentially identical to Shore A scale in the range investigated. Averages of three to five determinations are reported. Table 2 shows the amino alcohols used, their concentration relative to BDO, the theoretical and experimental urethane/urea concentrations, and stress/strain and hardness data of solution cast films. The first row in Table 2 is the "control", the sample prepared with BDO in the absence of amino alcohols.

linkages and the use of amino alcohols produces additional amounts of ureas.

Thus, polyurethanes, unless prepared in the complete absence of moisture (a rather difficult undertaking), are in fact poly(urethane ureas).

As shown by the data in Table 2, tensile strengths increase by substituting 20 mole % BDO with amino alcohols, and the nature of the co-CE strongly affects stress/strain values: While AE increases strength only marginally, AP increases it noticeably, and AB increases it substantially. Surprisingly, AB not only increased tensile strength (from 26.3±0.8 to 29.9±1.0 MPa), it also yielded remarkable strain enhancement (from 460±20 MPa to ~600%).

FIG. 2 show tensile stresses and strains, respectively, as a function of number of carbon atoms of the co-CEs. As can be seen, the best properties were obtained with the $C_4$ combination. FIG. 3 is a plot of stress versus strain data of PIS-PUUs obtained with various amino alcohols using 80/20 mole % BDO/co-CE. As can be seen, the best properties were obtained with AB. Overall, the stress/strain properties of PIB-PUs were found to be substantially

TABLE 2

Effect of various amino alcohols and their concentration on PIB-PUU mechanical properties

| Amino alcohol | Amino alcohol (mol %) in CE/co-CE | Theoretical Urethane/Urea (mole %/%) | Experimental Urethane/Urea (mole %/%)[a] | Tensile strength (MPa) | Tensile strain (%) | Hardness (Microshore) |
|---|---|---|---|---|---|---|
| None | 0 | — | 97/~3 | 26.3 ± 0.8 | 460 ± 20 | 77 |
| 2-Amino ethanol | 20 | 92.7/7.3 | N/A | 26.9 ± 1.3 | 435 ± 25 | 80[b] |
|  | 25 | 90.9/9.1 | N/A | 25.6 ± 1.5 | 384 ± 28 | 78[b] |
| 3-Amino propanol | 20 | 92.8/7.2 | 90.8/9.2 | 27.6 ± 1.5 | 525 ± 20 | 78 |
|  | 25 | 90.9/9.1 | N/A | 28.0 ± 0.7 | 532 ± 6 | 77 |
| 4-Amino butanol | 15 | 94.6/5.4 | N/A | ~17 | ~450 | N/A |
|  | 20 | 92.8/7.2 | 90.8/9.2 | 29.9 ± 1.0 | 555 ± 23 | 77/82[b] |
|  | 25 | 90.1/9.9 | N/A | Heterogeneous, hazy films |  | 83 |
|  | 25[c] | 91.0/9.0 | N/A | ~23 | ~500 | N/A |
| 6-Amino hexanol | 20 | 92.8/7.2 | 91.0/9.0 | ~20 | ~400 | N/A |

[a]Calculated from NMR spectra,
[b]annealed,
[c]dropwise co-CE addition

It should be noted that even the products prepared in the absence of amino alcohol contain ~3 mole % urea linkages (see Table 2, first row, the "control"). Commercial polyurethanes, for example Elast-Eon E2A, typically also contain 2-4% urea bonds due to traces of moisture during manufacture. It is well known that moisture impurity present in even "reagent grade" solvents hydrolyzes isocyanate groups to amines, which immediately react with other isocyanate groups to form urea linkages. Thus, all our PIB-PUUs is expected to contain a "background" of ~3 mole % urea enhanced by the use of the 80/20 mole % BDO/AB CE/co-CE combination.

Example 3

Similar experiments were also carried out by the use of polyether (polytetramethylene oxide, PTMO)-based PUs. The purpose was to determine the effect of CE/co-CE mixtures on the properties of conventional PTMO-based PUs. In these experiments we used 28.5/72.5 wt % hard/soft segment, i.e., the ratio used with PIB-PUs (Table 3).

TABLE 3

PUU prepared with PTMO-1000 and 4-amino butanol co-chain extender.

| Amino alcohol | Amino alcohol (mol %) in CE/co-CE | Theoretical Urethane/ Urea (mole %/%) | Experimental Urethane/ Urea (mole %/%)[a] | Tensile strength (MPa) | Tensile strain (%) | Hardness (Microshore) |
|---|---|---|---|---|---|---|
| 4-Amino butanol | 20 | 97.3/2.7 | N/A | 37.1 ± 2.4 | 1340 ± 49 | N/A |

A representative experiment was carried out as follows: Polytetramethylene oxide (PTMO-1000; 1.5010 g, 1.5010 mmol) was dissolved in THF (4 mL) and injected into a 25 mL round bottom flask containing distilled MDI (0.5441 g, 2.174 mmol) dissolved in 1 mL THF. The solution was heated to 65° C., DBTDL catalyst (1.4 mg, 0.0022 mmol-0.28 ml of 5 mg/mL THF solution) was added and the system stirred 1 h to obtain the 'prepolymer'. Then BDO (0.0408 g, 0.452 mmol, in 1.5 mL THF, prepared in a separate deoxygenated vial) was injected to the prepolymer solution and the mixture stirred for 0.5 h at 65° C. Upon BDO addition the solution became very viscous and ~10 mL of THF was added to maintain efficient stirring. Then a THF solution of AB (0.0100 g, 0.112 mmol) was added and the mixture stirred 2.5 hours. The warm solution was poured into a 7×7 cm glass mold, the solvent was evaporated in air and the sample was dried at 60° C. in a vacuum oven for 1 day. A homogeneous, slightly yellow, optically clear film was obtained.

Static mechanical properties were determined by Instron: 37.1±2.4 MPa tensile strength, 1340±49% elongation (average of 3 experiments). According to these results the use of AB enhances elongations.

Example 4

Spectroscopic Characterization

Nuclear Magnetic Resonance (NMR) Spectroscopy $^1$H-NMR spectra of PIB-PU made in the absence of AB and PIS-made with BDO/AB=80/20 mole % were taken using a Varian NMRS 500 spectrometer at 500 MHz by the use of THF-d8 at 30° C.

FIGS. 4A and B show idealized structures of corresponding PIB-PU (FIG. 4A) and PIB-PUU (FIG. 4B). FIG. 4C shows representative $^1$H-NMR spectra of PIB-PU, and PIB-PUU made with BDO/AB=80/20 mole %. Upon reaction of HO-PIS-OH with MDI and BDO, the signals associated with —CH$_2$O— shift downfield and appear as a multiplet at 3.82 ppm (due to BDO) and a triplet at 4.05 ppm (due to HO-PIS-OH). These signals confirm the formation of urethane linkages. The NH protons of urethane bonds appear at 8.48 and 8.54 ppm. The tiny singlet at 7.66 ppm is due to urea formed by traces of moisture. Two different kinds of urea linkages can be identified: (a) urea formed by reaction of MDI plus the amine of an amino alcohol, and (b) urea formed by reaction of an amine that arose from another MDI plus water.

Importantly, the PIB-PUU spectrum (FIG. 4C) shows two signals due to urea linkages absent in the PIB-PU spectrum: a multiplet at ~3.20 ppm due to —NH—CO—NH—CH$_2$—CH$_2$—, and a signal at ~5.42 ppm due to —NH—CO—NH—CH$_2$—CH$_2$—. The latter signal indicates a structure different from Ar—NH—CO—NH—Ar, i.e., the structure that would have arisen upon reaction of isocyanates with moisture. The PIB-PUU spectrum shows both urea protons.

Fourier Transform Infrared (FTIR) Spectroscopy

Infrared spectra of PIB-PU made in the absence of AB and PIB-PUUs made with BDO/AB=80/20 mole % according to embodiments of the present invention were recorded on a Nicolet 380 Fourier transform infrared (FT-IR) spectrometer equipped with a Smart Diamond ATR head, at 2 cm-1 resolution in the 400 to 4000 cm-1 range.

Insight into the nature of H bonding in PUs is provided by stretching vibrations in the 3200-3400 and 1600-1750 cm$^{-1}$ ranges associated with (free and H bonded) N—H and C═O groups, respectively (Jason Mattia and Paul Painter, "A Comparison of Hydrogen Bonding and Order in a Polyurethane and Poly(urethane-urea) and Their Blends with Poly (ethylene glycol)" Macromolecules, 40, 1546-1554, 2007). H bonding is indicated by the ~4740 cm$^{-1}$ band of free C═O shifting to ~1711 cm$^{-1}$ associated with C═O . . . H. In the presence of aromatic rings in the chain, the C═O stretch shifts to lower wavenumbers and induces an equal shift of all other bands.

Figure 1A:
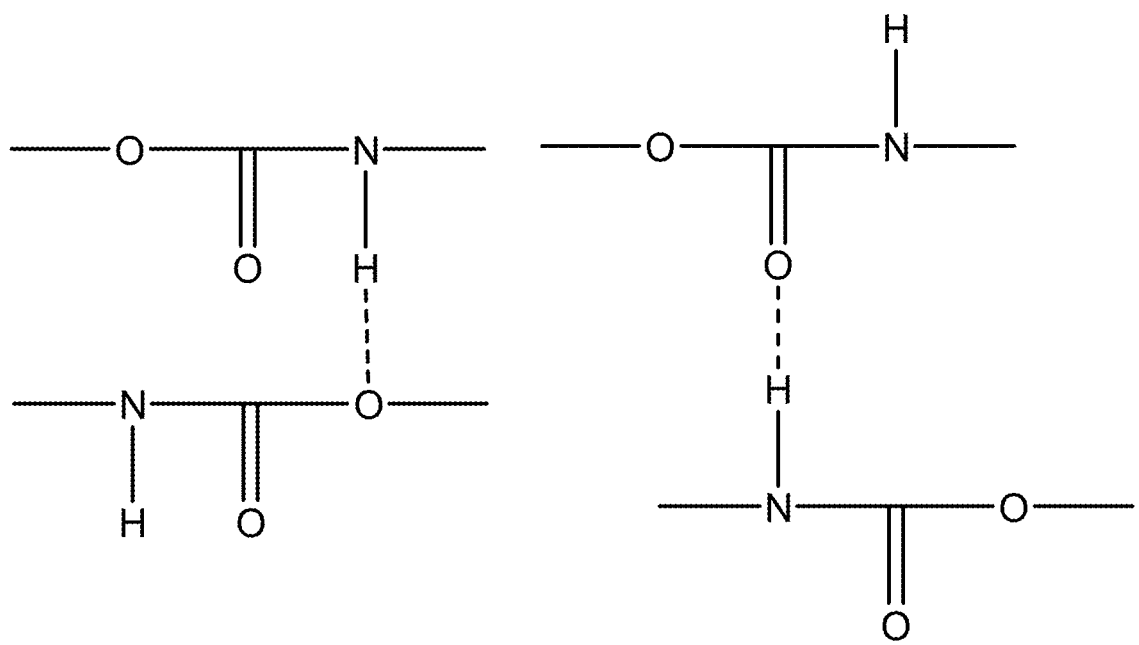
FIGS. 1A-B are diagrams showing the structures of linear H bonds arising from urethane groups in polyurethanes (FIG. 1A), and bifurcated H bonds arising from urea linkages in polyureas (FIG. 1B).
Figure 1B:
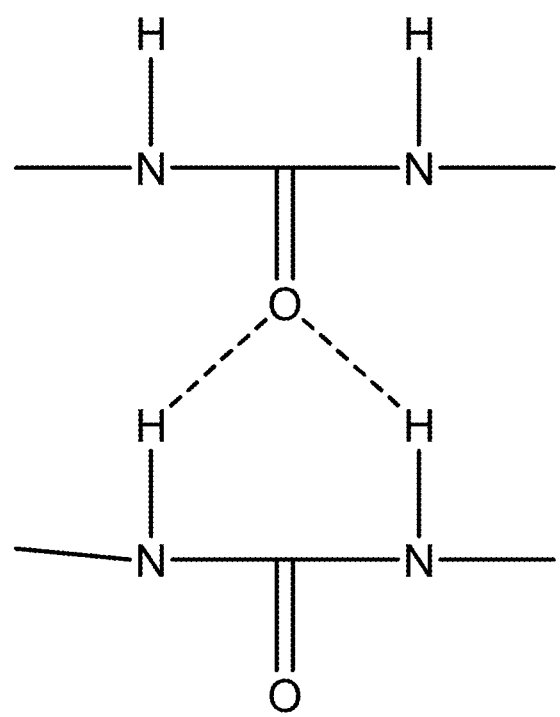

In polyureas the two N—H groups and one C═O group produce 2:1 bifurcated H bonds (see FIG. 1). The C═O stretch of polyureas occurs at lower frequencies (~4690 cm-1) than in polyurethanes (~4740 cm-1) due to the greater delocalization of π electrons of C═O bonds. In line with the greater strength (enthalpy) of the bifurcated 2:1 structure, the free C═O band (~1690 cm-1) shifts to lower wavenumbers associated with C═O . . . H (1650-1665 cm-1). Further, the 3440 cm-1 band associated with free N—H shifts to 3340 cm$^{-1}$ upon H bonding. Bifurcated N—H groups bonded to ether oxygen appear at ~3260 cm$^{-1}$.

FIGS. 5A-B show, respectively, the C═O and NH stretching regions in PIB-PU and PIB-PUU. The broad C═O band is due to two overlapping bands, i.e., to free and H bonded C═O bands at ~1730 cm$^{-1}$ and ~1701 cm$^{-1}$, respectively. The splitting of the C═O stretch into two components has frequently been observed (Coleman, M. M.; Painter, P. C. In Polymer Characterization Techniques and Their Application to Blends; Simon, G., Ed.; Oxford University Press: New York, 2003; Chapter 6, p 155.). The reason both the free and H bonded C═O stretch appear at somewhat lower wavenumbers than those given in the literature is due to the presence of the aromatic diisocyanate in the chain (Jason Mattia and Paul Painter, "A Comparison of Hydrogen Bonding and Order in a Polyurethane and Poly(urethane-urea) and Their Blends with Poly(ethylene glycol)" Macromolecules, 40, 1546-1554, 2007). Urea linkages in the PIB-PU chain, introduced by the amino alcohol, produce a shoulder at 1675 cm$^{-1}$ due to bifurcated H bonds (See, Luo, N., Wang D. N., Ying S. K., Polymer, 1996, 37, 3577, the disclosure of which is incorporated herein by reference in its entirety). The broadening of the band by the shoulder (due to urea linkages) suggests diminished melting enthalpy, i.e., less order, due to bifurcation. Woniak-Braszak et al. also correlated the breadth of the C=O band with the degree of disorder in poly(butylene terephthalate)/$C_{60}$ nanocomposites, and proposed that band broadening is due to the multiplicity of H bonds that diminishes order in the vicinity of the C=O group (Mattia et al., see previous reference). See also, Woniak-Braszak, A, Baranowsky, M., Jurga, K., Brycki, B., Mikuli, E., Hoderna-Natkaniec, K., "Complementary Study of Molecular Dynamics and Domain Sizes in Heterogeneous Nanocomposites PBT/DA-C60 and PBT/CNEO-C60", Journal of Applied Physics, 115, 204914, 2014 and Jason Mattia and Paul Painter, "A Comparison of Hydrogen Bonding and Order in a Polyurethane and Poly (urethane-urea) and Their Blends with Poly(ethylene glycol)" Macromolecules, 40, 1546-1554, 2007, the disclosures of which are incorporated herein by reference in their entirety.

Inspection of FIG. 5B indicates a small but noticeable intensity decrease of free N—H at ~3440 cm-1 and an increase in the breadth of H bonded N—H at ~3326 cm-1. These facts also suggest the formation of additional H bonds and imply the presence of bifurcated H bonds in PIB-PUU.

In sum, FTIR spectroscopy suggests the presence of bifurcated urea linkages in PIB-PUU formed by the use of amino butanol co-CE.

Example 5

Thermal Characterization

Differential Scanning Calorimetry (DSC)

The glass temperatures ($T_g$) and melting points ($T_m$) of PIB-PUUs according to various embodiments of the present invention were determined by differential scanning calorimetry using a TA Instruments Q2000. Approximately 8 mg samples were placed in aluminum pans, sealed by a quick press, and heated from −90 to 250° C. at 10° C./min. under $N_2$ atmosphere. Midpoint of heat capacity changes and peak maxima of DSC endotherms were taken as $T_g$ and $T_m$, respectively.

FIG. 6 shows representative DSC traces of a PIB-PU synthesized with BDO, and a PIB-PUU made with BDO/AB=80/20 mole %. The thermal transitions are consistent with phase separated thermoplastic elastomers. Both samples clearly show a Tg associated with the thermal motion of the PIS soft phase at ~−55° C. Close inspection of the traces indicates that the soft segment Tg of PIB-PUU is ~2° C. lower than that of PIB-PU (−50 vs. −52° C.). This noticeable lowering of soft segment Tg is likely due to bifurcated H bonding between urea groups; bifurcation reduces the number of H bonds to ether oxygens, which in turn increases the chain length between "crosslinks", and thus reduces $T_g$ (See, Markos-Fernandez, A., Lozano A. E., Gonzales L., Rodriguez A., "Hydrogen Bonding in Copoly (ether-urea)s and Its Relationship with the Physical Properties" Macromolecules, 1997, 30, 3584, the disclosure of which is incorporated herein by reference in its entirety).

In regard to hard phases, PIB-PU shows a $T_m$ at 185° C. and PIB-PUU at 174° C. The facts that the $T_m$ of PIB-PU is ~10° C. lower than that of PIB-PU, and that the melting endotherm of PIB-PU is noticeably smaller (4.5 J/g) than that of PIB-PUU (6.9 J/g), suggest decreased hard phase crystallinity in PIB-PUU, likely due to the partial replacement of linear H bonds by less symmetrical bifurcated H bonds. Similar observations have been reported by Mattia et al. for PU/PUU blends with polyethylene glycol (See, Mattia J. and Painter P., "A Comparison of H Bonding and Order In a Polyurethane and Poly(urethane-urea) and Their Blends with Poly(ethylene glycol)" Macromolecules, 40, 1546-1554, 2007, the the disclosure of which is incorporated herein by reference in its entirety). According to these authors reduced packing and decreased hard phase crystallinity are due to the simultaneous presence of linear and bifurcated H bonds.

Thermal Gravimetric Analysis (TGA)

Thermal stabilities of PIB-PU made in the absence of AB and PIB-PUU made with BDO/AB=80/20 mole % according to embodiments of the present invention were determined by thermal gravimetric analysis (TGA) using a TGA-Q500 instrument (TA Instruments) with ~8 mg samples heated from 20 to 600° C. at a heating rate of 10° C./min under $N_2$ atmosphere and derivative TGA (DTGA).

FIG. 7 summarizes the results of the thermal gravimetric analysis (TGA) and derivative TGA (DTGA) analyses. As expected, both PIB-PU and PIB-PUU show multistep thermal degradation, first the hard segments at ~320° C., followed by the soft segments at ~410° C. The rate of degradation of PIB-PUU is slightly lower than that of PIB-PU. Interestingly, PIB-PUU produces surprisingly larger amounts (more than three times) of carbonaceous char than PIB-PU, which predicts enhanced flame retardancy. Excess char formation upon burning is desirable as the char produces a barrier to both mass transport of degradation products and transfer of thermal energy from the heat source to the polymer. (See, M I Nelson (2001) A dynamical systems model of the limiting oxygen index test: II. Retardancy due to char formation and addition of inert fillers, Combustion Theory and Modelling, 5:1, 59-83, DOI: 10.1088/1364-7830/5/1/304, the disclosure of which is incorporated herein by reference in its entirety).

According to these observations, PIB-PUU exhibits somewhat better thermal stability than PIB-PU and (possibly) flame retardancy.

Example 6

Dynamic Mechanical Characterizations

The dynamic mechanical properties of thin (0.2×7×10 mm3) solvent cast films of PIB-PU made in the absence of AB and PIB-PUU made with BDO/AB=80/20 mole % were determined by Dynamic Mechanical Analysis (DMTA) using a dynamic mechanical analyzer (TA Instruments DMA-Q800) in film tension mode at 1 Hz, at 3° C./min heating rate in the −100 to 250° C. range. Creep and creep recovery experiments were performed applying 1 MPa constant stress and measuring time-dependent deformation in terms of creep compliance. Permanent deformation was determined by isothermal creep tests under constant stress for 15 min at 25° C., followed by recovery (load removal) for 25 min.

The DMTA results provides insights into processibility, specifically flow temperatures ($T_f$, i.e., the temperature where intermolecular interactions are overcome by thermal motion and the material starts to flow) of PIB-PU and PIB-PUU. According to DMTA traces shown in FIG. 8, the processibility of these materials is quite similar with $T_f$=130 and 138° C. of PIB-PU and PIB-PUU, respectively. While E' of PIB-PU decreases sharply with temperature in the −100 to 150° C. range, that of PIB-PUU decreases more slowly with a longer rubbery plateau consistent with stronger bifurcated H bonds. The tan delta of PIB-PUU is noticeably sharper than that of PUU.

The breadth of the tan delta peak in the vicinity of glass transition is correlatable with damping efficiency. (FIG. 8) Broad tan delta traces for both PIB-PU and PIB-PUU were expected as PIS is an excellent damping material. The PIB-PUU trace is somewhat broader than that of PIB-PU because bifurcated and linear H bonds yield various chain relaxations at different times/temperatures.

Overall, these DMTA results indicate that both PIB-PU and PIB-PUU exhibit flow characteristics appropriate for good processability and bifurcated H bonds do not reduce processability. (FIG. 8)

The results of the creep compliance, strain, strain recovery, and permanent deformation experiments are summarized in Table 4 and creep strain versus time profiles for PIB-PU and PIB-PUU are shown in FIG. 9. As can be seen, PIB-PUU shows slightly higher creep than does PIB-PU, probably due to less ordered domains. Both PIB-PU and PIB-PUU show very efficient strain recovery and low permanent set. The somewhat better recovery and set of PIB-PUU may be due to stronger bifurcated H linkages.

TABLE 4

Creep Compliance, Strain, Strain Recovery and Permanent Set of PIB-PU and PIB-PUU

| Samples | Creep Compliance ($\mu m^2/N$, $10^{-3}$) | Strain (%) | Strain Recovery (%) | Permanent Set (%) |
|---|---|---|---|---|
| PIB-PU | 116 | 13.20 | 92.43 | 0.99 |
| PIB-PUU | 154 | 15.36 | 93.69 | 0.97 |

In light of the foregoing, it should be appreciated that the present invention significantly advances the art by providing a PIB-PUU that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A polyisobutylene-based polyurethane-urea composition comprising:
   one or more soft segments comprising the residue of a polyisobutylene polyol, wherein the polyisobutylene polyol has the formula:

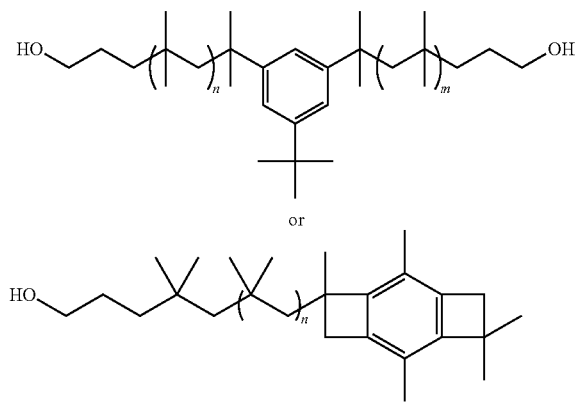

wherein n and m are each an integer from about 2 to about 5,000; and
   one or more hard segments comprising the residue of one or more diisocyanate and a chain extender combination comprising one or more low molecular weight diol chain extenders and one or more low molecular weight amino alcohol co-chain extenders, and wherein the one or more low molecular weight amino alcohol co-chain extender comprises from about 0.1 weight percent to about 10 weight percent of said chain extender combination.

2. The polyisobutylene-based polyurethane-urea composition as claimed in claim 1, wherein the polyisobutylene polyol is a polyisobutylene diol.

3. The polyisobutylene-based polyurethane-urea composition as claimed in claim 1, wherein the polyisobutylene polyol has a number average molecular weight of from 800 g/mol or more to 10,000 g/mol or less.

4. The polyisobutylene-based polyurethane-urea composition as claimed in claim 1, wherein the diisocyanate is selected from the group consisting of 4,4'-methylenebis (phenyl isocyanate) (MDI), 4,4'-methylenebis(cyclohexyl isocyanate) (HMDI), isophorone diisocyanate, toluene diisocyanate (TDI) and combinations thereof.

5. The polyisobutylene-based polyurethane-urea composition as claimed in claim 1, wherein the diisocyanate is 4,4'-methylenebis(phenyl isocyanate) (MDI).

6. The polyisobutylene-based polyurethane-urea composition as claimed in claim 1, wherein the one or more low molecular weight diol chain extender is selected from the group consisting of short chain diols including 1,4-butane diol (BDO), hexamethylene diol (HDO), polytetrahydrofuran diol, and combinations thereof.

7. The polyisobutylene-based polyurethane-urea composition as claimed in claim 1, wherein the one or more low molecular weight amino alcohol co-chain extender comprises a $C_2$-$C_{10}$ chain having a terminal hydroxyl group and a terminal amine group.

8. The polyisobutylene-based polyurethane-urea composition as claimed in claim 1, wherein the one or more low molecular weight amino alcohol co-chain extender is selected from the group consisting of 2-amino ethanol, 3-amino propanol, 4-amino butanol, 6-amino hexanol, and combinations thereof.

9. The polyisobutylene-based polyurethane-urea composition as claimed in claim 1, wherein the one or more low molecular weight diol chain extender is 1,4-butane diol, and the one or more low molecular weight amino alcohol co-chain extender is 4-amino butanol.

10. A polyisobutylene-based polyurethane-urea composition comprising:
    one or more soft segments comprising the residue of a polyisobutylene polyol; and
    one or more hard segments comprising the residue of one or more diisocyanate and a chain extender combination comprising a 1,4-butane diol diol chain extender and a 4-amino butanol co-chain extender, wherein the molar ratio of 1,4-butane diol to 4-amino butanol is 4:1.

11. The polyisobutylene-based polyurethane-urea composition as claimed in claim 1 having a number average molecular weight of from 1,000 g/mol or more to 100,000 g/mol or less.

12. The polyisobutylene-based polyurethane-urea composition as claimed in claim 1 having a creep compliance of from about 110 μm²/N, 10⁻³ or more to about 170 μm²/N, 10⁻³ or less.

13. The polyisobutylene-based polyurethane-urea composition as claimed in claim 1 having a storage modulus (E') of from about 5,000 MPa to about 5,700 MPa.

14. The polyisobutylene-based polyurethane-urea composition as claimed in claim 1 having a strain recovery of from about 90% to about 95%.

15. The polyisobutylene-based polyurethane-urea composition as claimed in claim 1 having a microshore hardness of from about 70 to about 90.

16. The polyisobutylene-based polyurethane-urea composition as claimed in claim 1 having a tensile strength of from about 15 MPa to about 35 MPa.

17. The polyisobutylene-based polyurethane-urea composition as claimed in claim 1 having a tensile strain of from about 300% to about 700%.

18. The polyisobutylene-based polyurethane-urea composition as claimed in claim 1 having a melting temperature ($T_m$) of from about 165° C. to about 185° C.

19. The polyisobutylene-based polyurethane-urea composition as claimed in claim 1 having a flow temperature ($T_f$) of from about 133° C. to about 145° C.

20. The polyisobutylene-based polyurethane-urea composition as claimed in claim 1 wherein said composition is melt processable.

21. A polyisobutylene-based polyurethane-urea composition having the formula:

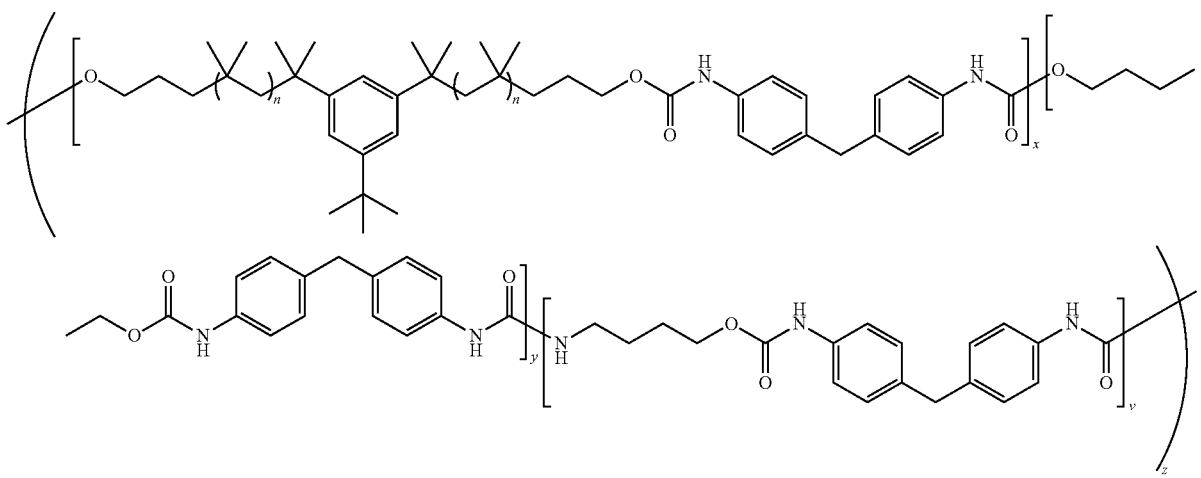

where each n is an integer from about 2 to 5,000; z is an integer from about 2 to 1,000,000; x is a mole percentage of a polyisobutylene polyol; y is a mole percentage of one or more low molecular weight diol chain extenders; v is a mole percentage of one or more amino-alcohol co-chain extenders; and x+y+v=100%.

22. A polyisobutylene-based polyurethane-urea composition comprising the reaction product of a polyisobutylene diol having a number average molecular weight of from 800 g/mol or more to 10,000 g/mol or less, wherein the polyisobutylene diol has the formula:

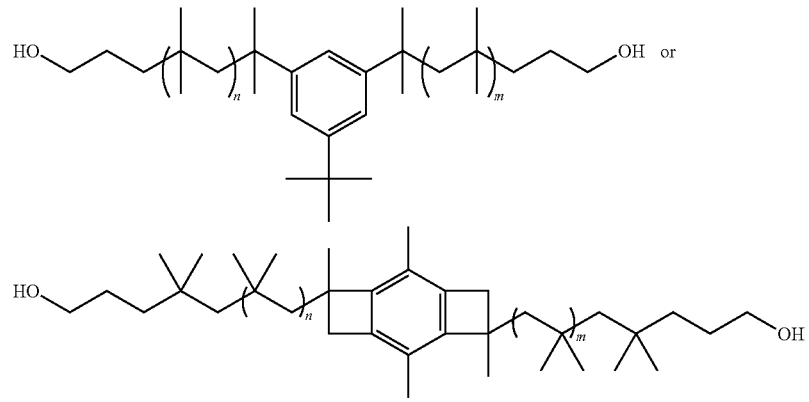

wherein n and m are each an integer from about 2 to about 5,000; one or more diisocyanate selected from the group consisting of 4,4'-methylenebis(phenyl isocyanate) (MDI), 4,4'-methylenebis(cyclohexyl isocyanate) (HMDI), isophorone diisocyanate, toluene diisocyanate (TDI) and combinations thereof; one or more low molecular weight diol chain extender selected from the group consisting of short chain diols including 1,4-butane diol (BDO), hexamethylene diol (HDO), polytetrahydrofuran diol, and combinations thereof; and one or more low molecular weight amino alcohol co-chain extender comprises a $C_2$-$C_{10}$ chain having a terminal hydroxyl group and a terminal amine group, and wherein the one or more low molecular weight amino alcohol co-chain extender comprises from about 0.1 weight percent to about 10 weight percent of said chain extender combination.

23. The polyisobutylene-based polyurethane-urea composition as claimed in claim 22, having improved mechanical properties compared to the corresponding polyisobutylene-based polyurethane composition.

24. The polyisobutylene-based polyurethane-urea composition as claimed in claim 22, wherein said polyisobutylene-based polyurethane-urea composition is melt processable.

* * * * *